US012189319B2

(12) United States Patent
Sone et al.

(10) Patent No.: US 12,189,319 B2
(45) Date of Patent: Jan. 7, 2025

(54) IMAGE FORMING APPARATUS TO PERFORM PHASE MATCHING CONTROL TO MATCH PHASES OF IMAGE-DENSITY CYCLE FLUCTUATIONS

(71) Applicants: Keita Sone, Tokyo (JP); Tomohide Takenaka, Kanagawa (JP); Naoki Ohta, Kanagawa (JP)

(72) Inventors: Keita Sone, Tokyo (JP); Tomohide Takenaka, Kanagawa (JP); Naoki Ohta, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/203,067

(22) Filed: May 30, 2023

(65) Prior Publication Data

US 2023/0384725 A1 Nov. 30, 2023

(30) Foreign Application Priority Data

May 30, 2022 (JP) ................................ 2022-087782

(51) Int. Cl.
*G03G 15/00* (2006.01)
*G03G 15/02* (2006.01)
(Continued)

(52) U.S. Cl.
CPC ..... *G03G 15/5041* (2013.01); *G03G 15/0266* (2013.01); *G03G 15/043* (2013.01);
(Continued)

(58) Field of Classification Search
CPC .......... G03G 15/5041; G03G 15/5058; G03G 2215/00042; G03G 2215/00059;
(Continued)

(56) References Cited

U.S. PATENT DOCUMENTS

2012/0294637 A1* 11/2012 Tanaka .................... H04N 1/60 399/49
2014/0268242 A1 9/2014 Kaneko et al.
(Continued)

FOREIGN PATENT DOCUMENTS

EP 1 727 000 A2 11/2006
EP 1 845 420 A2 10/2007
(Continued)

OTHER PUBLICATIONS

Extended European Search Report issued Oct. 13, 2023, in corresponding European Application No. 23175442.5, 9pp.

*Primary Examiner* — Robert B Beatty
(74) *Attorney, Agent, or Firm* — XSENSUS LLP

(57) ABSTRACT

An image forming apparatus includes a plurality of image forming units, an exposure device, and circuitry. Each image forming unit includes an image bearer, a charger, and a developer bearer. The circuitry acquires an image-density cycle fluctuation in a visible image for each image forming unit and performs image-density fluctuation-reduction control to cyclically change image forming conditions to reduce the image-density cycle fluctuation. The circuitry performs: first fluctuation-reduction control to correct a developing bias to cancel an image-density cycle fluctuation of a high-density image pattern; second fluctuation-reduction control to, after the first fluctuation-reduction control, correct a charging bias to cancel an image-density cycle fluctuation of a first low-density image pattern; and third fluctuation-reduction control to, after the first and second fluctuation-reduction controls, correct an exposure light amount to cancel an image-density cycle fluctuation of a second low-density image pattern.

8 Claims, 15 Drawing Sheets

(51) Int. Cl.
*G03G 15/043* (2006.01)
*G03G 15/06* (2006.01)

(52) U.S. Cl.
CPC . *G03G 15/065* (2013.01); *G03G 2215/00042* (2013.01); *G03G 2215/0164* (2013.01)

(58) Field of Classification Search
CPC ....... G03G 2215/0164; G03G 15/0266; G03G 15/065; G03G 15/043
USPC ........................................................... 399/49
See application file for complete search history.

(56) References Cited

U.S. PATENT DOCUMENTS

| | | | | |
|---|---|---|---|---|
| 2014/0270827 | A1* | 9/2014 | Muto ................. | G03G 15/5058 399/49 |
| 2015/0234316 | A1* | 8/2015 | Kanaya ............. | G03G 15/5058 430/30 |
| 2017/0227887 | A1* | 8/2017 | Shirakata ........... | G03G 15/5062 |
| 2017/0269527 | A1 | 9/2017 | Kaneko et al. | |
| 2018/0136593 | A1* | 5/2018 | Kaneko .............. | G03G 15/5025 |
| 2018/0143581 | A1 | 5/2018 | Nakayama et al. | |
| 2018/0150010 | A1 | 5/2018 | Sone et al. | |
| 2019/0064719 | A1 | 2/2019 | Tachi et al. | |
| 2021/0318651 | A1 | 10/2021 | Tachi et al. | |
| 2023/0127750 | A1 | 4/2023 | Takenaka | |
| 2023/0152732 | A1 | 5/2023 | Ohta | |

FOREIGN PATENT DOCUMENTS

| | | |
|---|---|---|
| JP | 2014-178404 | 9/2014 |
| JP | 2017-102424 | 6/2017 |
| JP | 2017-173357 | 9/2017 |
| JP | 2021-182124 | 11/2021 |

* cited by examiner

IMAGE FORMING APPARATUS TO PERFORM PHASE MATCHING CONTROL TO MATCH PHASES OF IMAGE-DENSITY CYCLE FLUCTUATIONS

CROSS-REFERENCE TO RELATED APPLICATION

This patent application is based on and claims priority pursuant to 35 U.S.C. § 119(a) to Japanese Patent Application No. 2022-087782, filed on May 30, 2022, in the Japan Patent Office, the entire disclosure of which is hereby incorporated by reference herein.

BACKGROUND

Technical Field

Embodiments of the present disclosure relate to an image forming apparatus.

Related Art

Image forming apparatuses are known in the art that include a plurality of image forming units, each including an image bearer and a developer bearer, to form a visible image by attaching developer borne on the developer bearer to the image bearer and an image-density cycle-fluctuation acquiring unit that acquires an image-density cycle fluctuation in each of the plurality of image forming units.

As such image forming apparatuses, for example, an apparatus corrects the cycle fluctuation of the image density by changing a developing bias and a charging bias on the basis of the image-density cycle fluctuation having one rotation of the image bearer as one cycle acquired by the image-density cycle-fluctuation acquiring unit.

Alternatively, a configuration is known in which phase matching control is performed to match phases of image-density cycle fluctuations of respective halftone images of image forming units that remain without being corrected by image-density fluctuation-reduction control, thereby to reduce cycle changes in color tone of a full-color image formed by superimposing visible images formed by the image forming units.

SUMMARY

According to an embodiment of the present disclosure, an image forming apparatus includes a plurality of image forming units, an exposure device, and circuitry. The plurality of image forming units each includes an image bearer, a charger to uniformly charge the image bearer, and a developer bearer to attach developer to an electrostatic latent image on the image bearer to form a visible image. The exposure device exposes the image bearer charged by the charger to form the electrostatic latent image on the image bearer. The circuitry acquires an image-density cycle fluctuation in the visible image for each of the plurality of image forming units; and performs image-density fluctuation-reduction control to cyclically change image forming conditions to reduce the image-density cycle fluctuation for each of the plurality of image forming units on basis of the image-density cycle fluctuation of each of the plurality of image forming units acquired by the circuitry. The circuitry performs: first fluctuation-reduction control to correct a developing bias applied to the developer bearer, which is one of the image forming conditions, to cancel an image-density cycle fluctuation of a high-density image pattern acquired by the circuitry; second fluctuation-reduction control to, after the first fluctuation-reduction control, correct a charging bias applied to the charger, w % bich is one of the image forming conditions, to cancel an image-density cycle fluctuation of a first low-density image pattern acquired by the circuitry; and third fluctuation-reduction control to, after the first fluctuation-reduction control and the second fluctuation-reduction control, correct an exposure light amount of the exposure device, which is one of the image forming conditions, to cancel an image-density cycle fluctuation of a second low-density image pattern acquired by the circuitry, the high-density image pattern being higher in image density than each of the first low-density image pattern and the second low-density image pattern.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
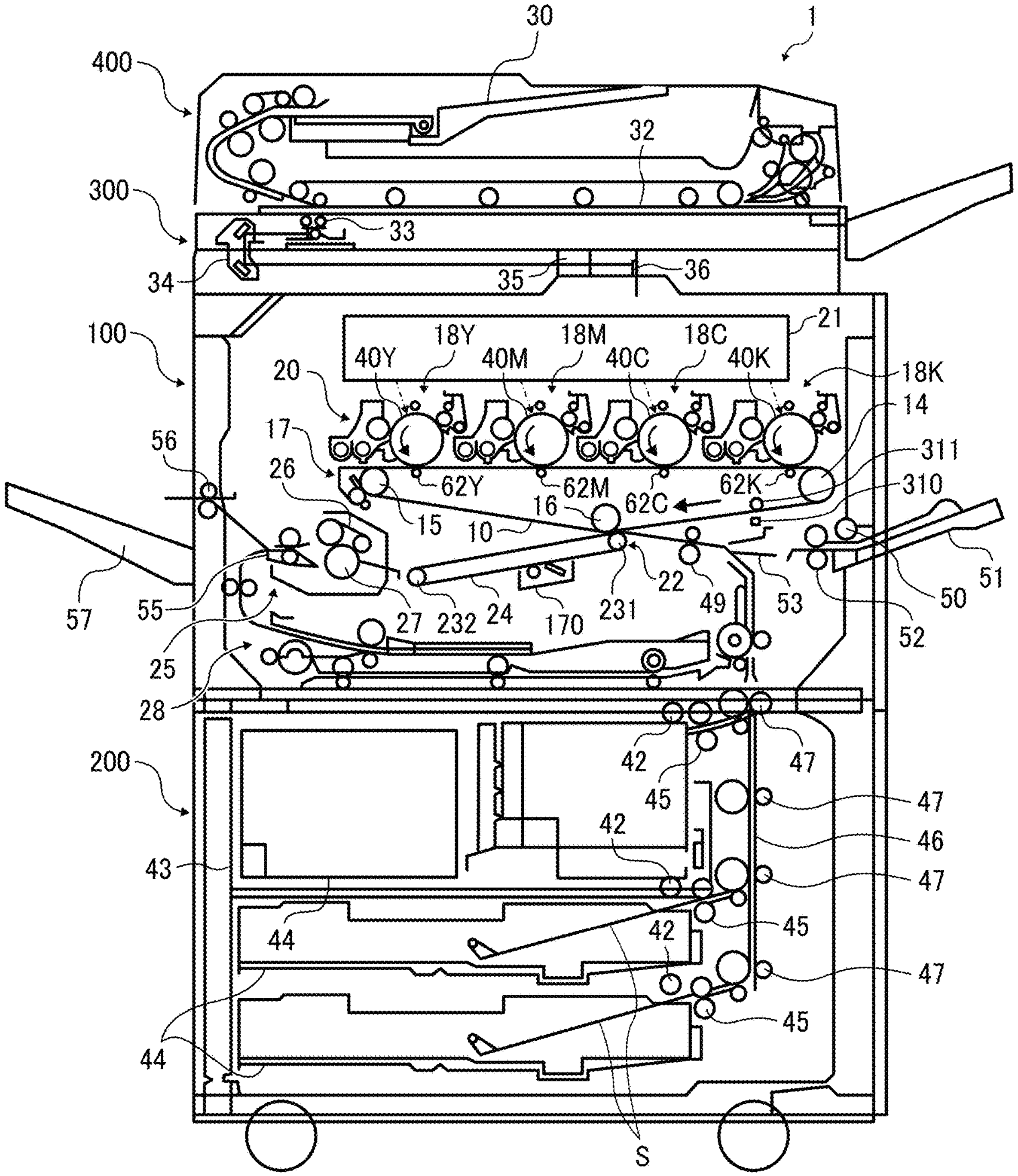
FIG. 1 is a schematic configuration diagram of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An embodiment according to the present disclosure will be described below with reference to the drawings.

<Image Forming Apparatus in Present Embodiment>

First, an image forming apparatus according to an embodiment of the present disclosure will be described.

Hereinafter, the embodiment will be described with reference to the drawings.

FIG. 1 is a schematic configuration diagram of an example of an image forming apparatus according to an embodiment of the present disclosure. Referring to FIG. 1, an image forming apparatus 1 of the present embodiment includes an apparatus body (printer unit) 100, a sheet feeder 200 as a recording medium supply unit on which the apparatus body 100 is placed, and a scanner 300 as an image reading device mounted on the apparatus body 100. The image forming apparatus 1 according to the present embodiment further includes an automatic document feeder (ADF) 400 mounted on the scanner 300.

An intermediate transfer belt 10 formed of an endless belt as a surface moving member is provided in the center of the apparatus body 100. The intermediate transfer belt 10 is stretched around support rollers 14, 15, and 16 as three support rotators, and rotationally moves in a clockwise direction in FIG. 1. On the left of the second support roller 15 of the three support rollers in FIG. 1, an intermediate transfer belt cleaner 17 is disposed. The intermediate transfer belt cleaner 17 removes residual toner on the intermediate transfer belt 10 after image transfer. In addition, a tandem image forming section 20 as an image forming section is disposed so as to face a belt portion of the intermediate transfer belt 10 stretched across the first support roller 14 and second support roller 15 of the three support rollers.

As illustrated in FIG. 1, the tandem image forming section 20 has a configuration in which four image forming units 18Y, 18M, 18C, and 18K of yellow (Y), magenta (M), cyan (C), and black (K) are arranged side by side along a belt movement direction of the belt portion. In the present embodiment, the third support roller 16 is a drive roller. Above the tandem image forming section 20, an exposure device 21 as an exposure device is provided.

A secondary transfer device 22 as a secondary transfer unit is disposed on the side opposite to the tandem image forming section 20 with the intermediate transfer belt 10 in between. In the secondary transfer device 22, a secondary transfer belt 24, which is an endless belt as a transfer sheet conveying member, is stretched between two rollers 231 and 232. The secondary transfer belt 24 is disposed to be pressed against the third support roller 16 with the intermediate transfer belt 10 in between. The secondary transfer device 22 transfers the toner image on the intermediate transfer belt 10 to a transfer sheet S that is a transfer material as a recording medium. Additionally, a cleaning device 170 may be provided to clean the outer circumferential surface of the secondary transfer belt 24 as illustrated in FIG. 1.

On the left side of the secondary transfer device 22 in FIG. 1, a fixing device 25 is disposed to fix the toner image having been transferred onto the sheet S. The fixing device 25 is configured such that a pressure roller 27 is pressed against the fixing belt 26 that is an endless belt to be heated.

The secondary transfer device 22 has a sheet conveyance function to convey the sheet S to the fixing device 25 after the toner image is transferred from the intermediate transfer belt 10 onto the sheet S. Below the secondary transfer device 22 and the fixing device 25, a sheet reverse unit 28 is disposed in parallel to the tandem image forming section 20 and reverses the sheet S to print both sides of the sheet S.

In order to make a copy using the image forming apparatus 1 having the above configuration, a document is set on a document table 30 of the automatic document feeder 400. Alternatively, the user may open the automatic document feeder 400, place the document on an exposure glass 32 of the scanner 300, and close the automatic document feeder 400 to press the document against the exposure glass 32. If the document is set in the automatic document feeder 400, pressing the start switch of an operation unit conveys and moves the document onto the exposure glass 32.

When the user sets the document on the exposure glass 32 and presses the start switch, the scanner 300 is driven immediately to move a first carriage 33 and a second carriage 34. Subsequently, the first carriage 33 directs an optical beam from a light source onto the document, and then the optical beam is reflected from a surface of the document to the second carriage 34. Further, the optical beam reflected from a mirror of the second carriage 34 passes through an imaging forming lens 35 and then enters an image reading sensor 36. Thus, the image reading sensor 36 reads the image on the document to obtain the image data.

In parallel with the document reading, the third support roller 16 as a drive roller is rotationally driven by a drive motor as a drive source. As a result, the intermediate transfer belt 10 moves in the clockwise direction in FIG. 1, and the remaining two support rollers (driven rollers) 14 and 15 rotate together with this movement.

Simultaneously with the document reading and the movement of the intermediate transfer belt 10, the drum-shaped photoconductors 40Y, 40M, 40C, and 40K as image bearers are rotated in the individual image forming units 18. Then, exposure and development are performed on the photoconductors 40Y, 40M, 40C, and 40K by using color information of yellow, magenta, cyan, and black, respectively, thereby to form toner images (developed images) of single colors.

Primary transfer devices 62Y, 62M, 62C, and 62K each having a primary transfer roller as a primary transfer unit are provided at positions facing to the photoconductors 40Y, 40M, 40C, and 40K across the belt portion between the support rollers 14 and 15 of the intermediate transfer belt 10. The primary transfer devices 62Y, 62M, 62C, and 62K sequentially transfer the toner images on the photoconductors 40Y, 40M, 40C, and 40K onto the intermediate transfer belt 10 so as to overlap one another, thereby forming a composite color toner image on the intermediate transfer belt 10.

In parallel with the image forming operation, one of the sheet feeding rollers 42 of the sheet feeder 200 is selectively rotated, and the transfer sheets S are fed from one of the sheet feeding cassettes 44 provided in multiple stages in the paper bank 43. The fed sheets S are separated one by one by a separation roller pair 45. The separated sheet S is inserted into a sheet conveyance path 46, conveyed by conveyance rollers 47 to a sheet conveyance path inside the apparatus body 100, and stopped by a registration roller pair 49 when the sheet S contacts the registration roller pair 49. Alternatively, a bypass feed roller 50 rotates to move sheets S placed on a bypass feeder 51. The moved sheets are separated by a bypass separation roller 52 one by one. The separated sheet is conveyed to a bypass sheet conveyance path 53 and stopped by the registration roller pair 49 when the sheet contacts the registration roller pair 49.

Next, the registration roller pair 49 is rotated in timing with the composite color toner image on the intermediate transfer belt 10, and the transfer sheet S is sent between the intermediate transfer belt 10 and the secondary transfer device 22. Thereafter, the color toner image is transferred onto the transfer sheet S by the secondary transfer device 22.

The secondary transfer belt 24 conveys the sheet S bearing the color toner image to the fixing device 25. In the fixing device 25, the fixing belt 26 and the pressure roller 27 apply heat and pressure to the sheet S to fix the color toner image on the sheet S. After the above fixing process, a switching craw 55 directs the sheet S to an ejection roller pair 56. The ejection roller pair 56 ejects the sheet S onto a sheet ejection tray 57 that stacks the sheet S. Alternatively, the switching craw 55 directs the sheet S to the sheet reverse unit 28. The sheet reverse unit 28 reverses the sheet S and guides the sheet S to the secondary transfer nip where another toner image is transferred onto a back side of the sheet S. Thereafter, the ejection roller pair 56 ejects the sheet S onto the sheet ejection tray 57.

The intermediate transfer belt cleaner 17 removes residual toner that remains on the intermediate transfer belt 10 after the secondary transfer of the color toner image from the intermediate transfer belt 10, and the tandem image forming section 20 becomes ready for a next image formation. In general, the registration roller pair 49 is grounded, however, the registration roller pair 49 may be applied with a bias voltage to remove paper dust from the sheet S.

The apparatus body 100 also includes a toner adhesion amount sensor 310 as a density detection sensor which is an optical sensor unit including an optical sensor and the like, as a density detector which detects the density of the toner image on the outer peripheral surface of the intermediate transfer belt 10. The toner adhesion amount sensor 310 functions as a density detector that detects the density of the toner image on the intermediate transfer belt 10 in order to detect the adhesion amount of the toner on the intermediate transfer belt 10 and detect unevenness in the density of the image. The toner adhesion amount sensor 310 is also called a toner image detection sensor or a toner adhesion amount detection sensor. The toner adhesion amount sensor 310 detects the density of a toner image in an image pattern for correction control (to be described later) on the surface of the intermediate transfer belt 10 for use in the correction control of the image unevenness. In addition, as illustrated in FIG. 1, a facing roller 311 may be disposed at a position opposite the toner adhesion amount sensor 310 via the intermediate transfer belt 10.

<Configuration of Tandem Image Forming Section>

Figure 2:
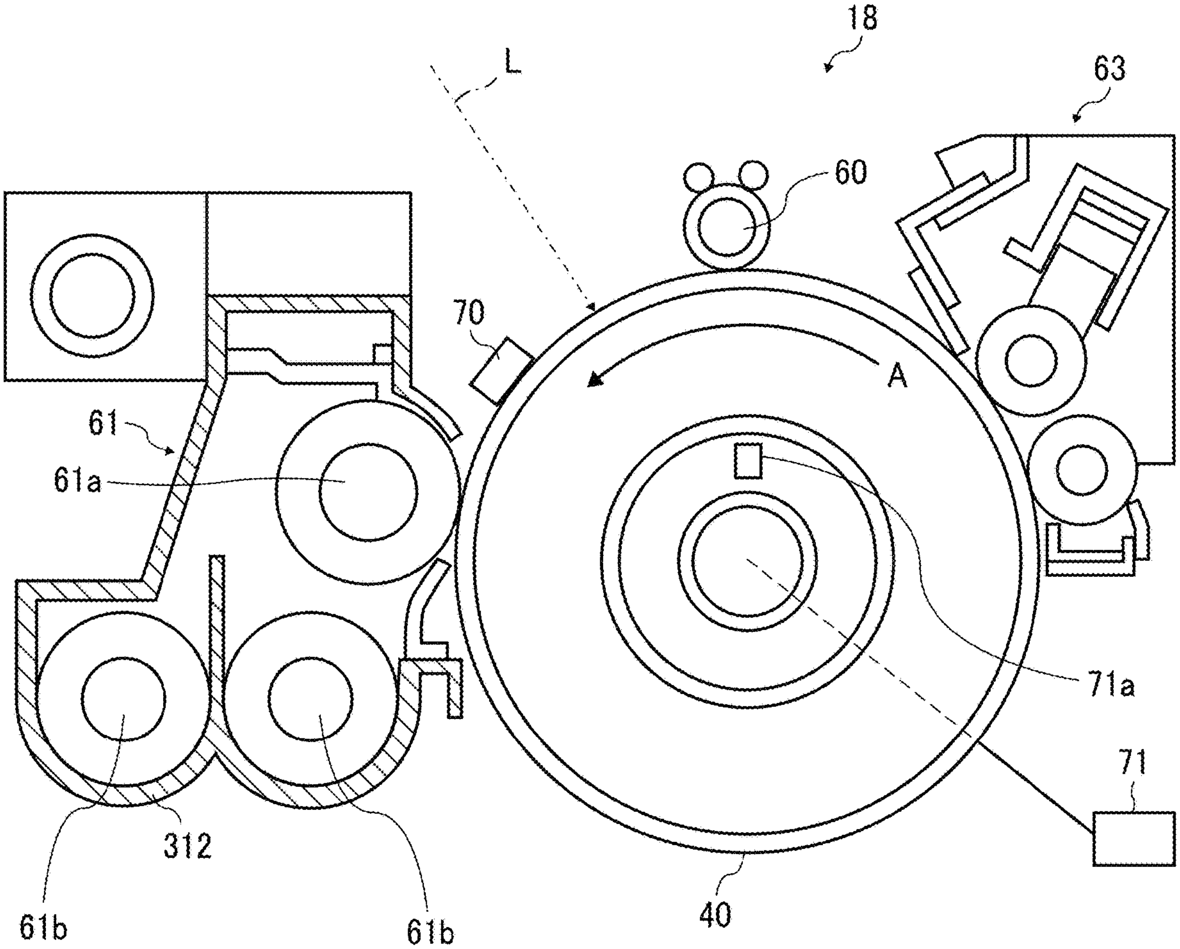
FIG. 2 is a diagram illustrating a configuration example of a tandem image forming section in the image forming apparatus of FIG. 1.

FIG. 2 is a diagram illustrating a configuration example of the tandem image forming section of the image forming apparatus 1 according to the present embodiment. Since the image forming units 18 have the same configuration, the color symbols of Y, M, C, and K will be omitted as appropriate in the following description.

For example, as illustrated in FIG. 2, the image forming unit 18 includes a charging device 60 as a charger, a potential sensor 70, a developing device 61 as a developing unit, a photoconductor cleaning device 63, a static eliminator, and the like around a drum-shaped photoconductor 40.

At the time of the image forming operation, the photoconductor 40 is rotationally driven in the direction of arrow A by a drive motor as an image bearer rotation driver. Then, after the surface of the photoconductor 40 is uniformly charged by the charging device 60, the photoconductor 40 is exposed by write exposure L from the exposure device 21 controlled on the basis of an image signal of a document or the like from the scanner 300 described above, thereby to form an electrostatic latent image. The color image signals generated according to the image data by the scanner 300 are subjected to imaging processes such as a color conversion process by an image processor and output to the exposure device 21 as an image signal for each color of K, Y, M. and C. The exposure device 21 converts the image signal from the image processing unit into an optical signal, and scans and exposes the uniformly charged surface of the photoconductor 40 on the basis of the optical signal to form an electrostatic latent image.

A developing bias is applied to a developing roller 61*a* as a developer bearer of the developing device 61, and a developing potential that is a potential difference is formed between the electrostatic latent image on the photoconductor 40 and the developing roller 61*a*. The toner on the developing roller 61*a* is transferred from the developing roller 61*a* to the electrostatic latent image on the photoconductor 40 by the developing potential, whereby the electrostatic latent image is developed to form a toner image. In addition, a toner concentration sensor 312 to detect the toner concentration in the developer is provided on the bottom surface of the developer conveyance part in which developer conveyance screws 61*b* are disposed in the developing device 61.

The toner image on the photoconductor 40 is primarily transferred onto the intermediate transfer belt 10 by the primary transfer device 62. After the toner image is transferred, the photoconductor 40 is cleaned to remove the residual toner by the photoconductor cleaning device 63 and is neutralized by the neutralizing device, so that the photoconductor is prepared for the next image formation.

In the image forming apparatus 1 having the above configuration, the exposure device 21 and the charging devices 60Y, 60M, 60C, and 60K function as latent image forming sections that form electrostatic latent images on the surfaces of the photoconductors 40Y, 40M, 40C, and 40K. The exposure device 21, the charging devices 60Y, 60M, 60C, and 60K, and developing devices 61Y, 61M, 61C, and 61K function as toner image forming sections that form toner images on the surfaces of the photoconductors 40Y, 40M, 40C, and 40K.

In the image forming apparatus 1 of the present embodiment, the image forming units 18 of Y, M, and C include a photointerrupter 71 as a rotation position detector that detects a part 71*a* to be detected at the rotation reference position of the photoconductor 40. The photointerrupter 71 optically detects the part 71*a* to be detected provided on the photoconductor 40. In the photointerrupter 71, for example, a light emitting element and a light receiving element are disposed to face each other. When the part 71*a* to be detected provided on the photoconductor 40 passes between the elements and blocks light, the photointerrupter 71 detects the rotation reference position of the photoconductor. The rotation reference position detector that detects the rotation reference position of the photoconductor 40 may be a means other than the photointerrupter.

Figure 3A:
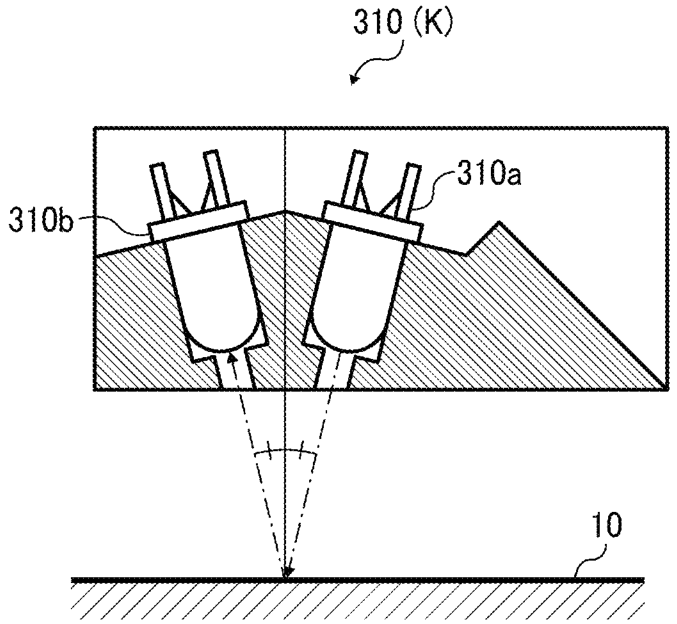
FIGS. 3A and 3B are diagrams of configuration examples of toner adhesion amount sensors that detect density of a toner image in the image forming apparatus of FIG. 1.
Figure 3B:
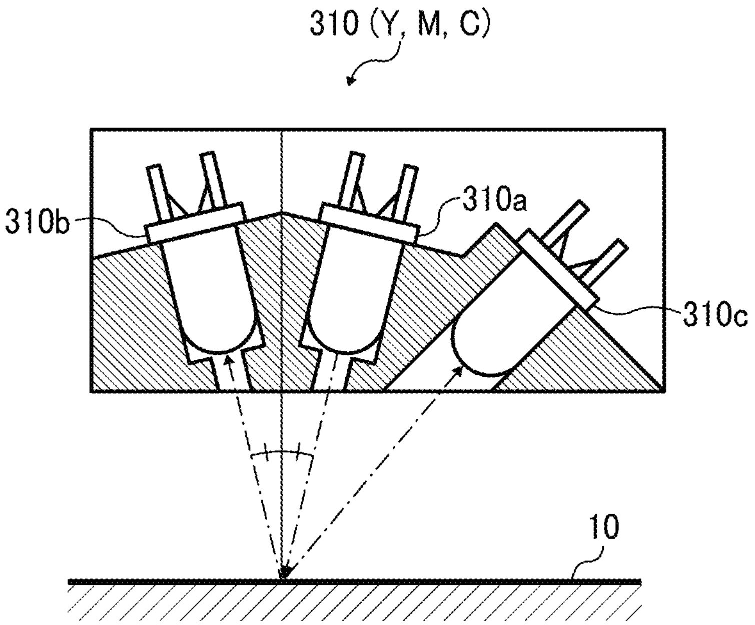

FIGS. 3A and 3B are explanatory diagrams illustrating an exemplary configuration of the toner adhesion amount sensor 310 as an image density detector that detects the density of a toner image in the image forming apparatus 1 according to the present embodiment. FIG. 3A illustrates a configuration example of a black toner adhesion amount sensor 310(K) suitable for detecting the density of a black toner image, and FIG. 3B illustrates a configuration example of a color toner adhesion amount sensor 310(Y, M, and C) suitable for detecting the density of a color toner image other than a black toner image.

As illustrated in FIG. 3A, the black toner adhesion amount sensor 310(K) includes a light emitting element 310*a* formed of a light emitting diode (LED) and the like, and a regular reflection light receiving element 310*b* that receives regular reflection light. The light emitting element 310*a* irradiates the intermediate transfer belt 10 with light, and this irradiation light is reflected by the intermediate transfer belt 10. The regular reflection light receiving element 310*b* receives regular reflection light out of the reflected light.

On the other hand, as illustrated in FIG. 3B, the color toner adhesion amount sensor 310(Y, M, C) includes a light emitting element 310*a* formed of a light emitting diode (LED) or the like, a regular reflection light receiving element 310*b* that receives regular reflection light, and a diffuse reflection light receiving element 310*c* that receives diffuse reflection light. As in the case of the black toner adhesion amount sensor, the light emitting element 310*a* irradiates the intermediate transfer belt 10 with light, and the irradiation light is reflected by the surface of the intermediate transfer belt 10. The regular reflection light receiving element 310*b* receives regular reflection light out of the reflected light, and the diffuse reflection light receiving element 310*c* receives diffuse reflection light out of the reflected light.

In the present embodiment, a GaAs infrared light emitting diode in which the peak wavelength of emitted light is 950 nm is used as the light emitting element, and a silicon (Si) phototransistor in which the peak light receiving sensitivity is 800 nm is used as the light receiving element. In some embodiments, the light emitting element and the light receiving element may have different peak wavelengths and peak light-receiving sensitivities. Further, there is provided a distance (detection distance) of about 5 mm, for example, between the black toner adhesion amount sensor 310(K) and the color toner adhesion amount sensor 310(Y, M, C) and the belt surface of the intermediate transfer belt 10 to which the toner image as the detection object is transferred.

In the present embodiment, the toner adhesion amount sensor 310 is provided near the intermediate transfer belt 10, and the toner image of a predetermined image pattern on each of the photoconductors 40Y, 40M, 40C, and 40K is transferred to the intermediate transfer belt 10 to detect the image density of the toner image. The image formation condition (image formation condition) is determined based on the detection result of the image density of the toner (toner adhesion amount) detected on the intermediate transfer belt. The toner adhesion amount sensor 310 is provided near the intermediate transfer belt 10 as described above. Alternatively, the toner adhesion amount sensor 310 may be disposed near each of the photoconductors 40Y, 40M, 40C, and 40K or near the transfer conveyance belt that conveys the transfer sheet S. Then, the densities of the toner images on the photoconductors 40Y, 40M, 40C, and 40K may be directly detected without the intermediate transfer belt 10 interposed therebetween, or the densities of the toner images may be detected by transferring the toner images from the photoconductors to the transfer conveyance belt.

Outputs from the black toner adhesion amount sensor 310 (K) and the color toner adhesion amount sensor 310 (Y, M, C) are converted into toner adhesion amounts by an adhesion amount conversion algorithm. The adhesion amount conversion algorithm can be an algorithm similar to a conventional algorithm.

Next, features of the present embodiment will be described.

Figure 4:
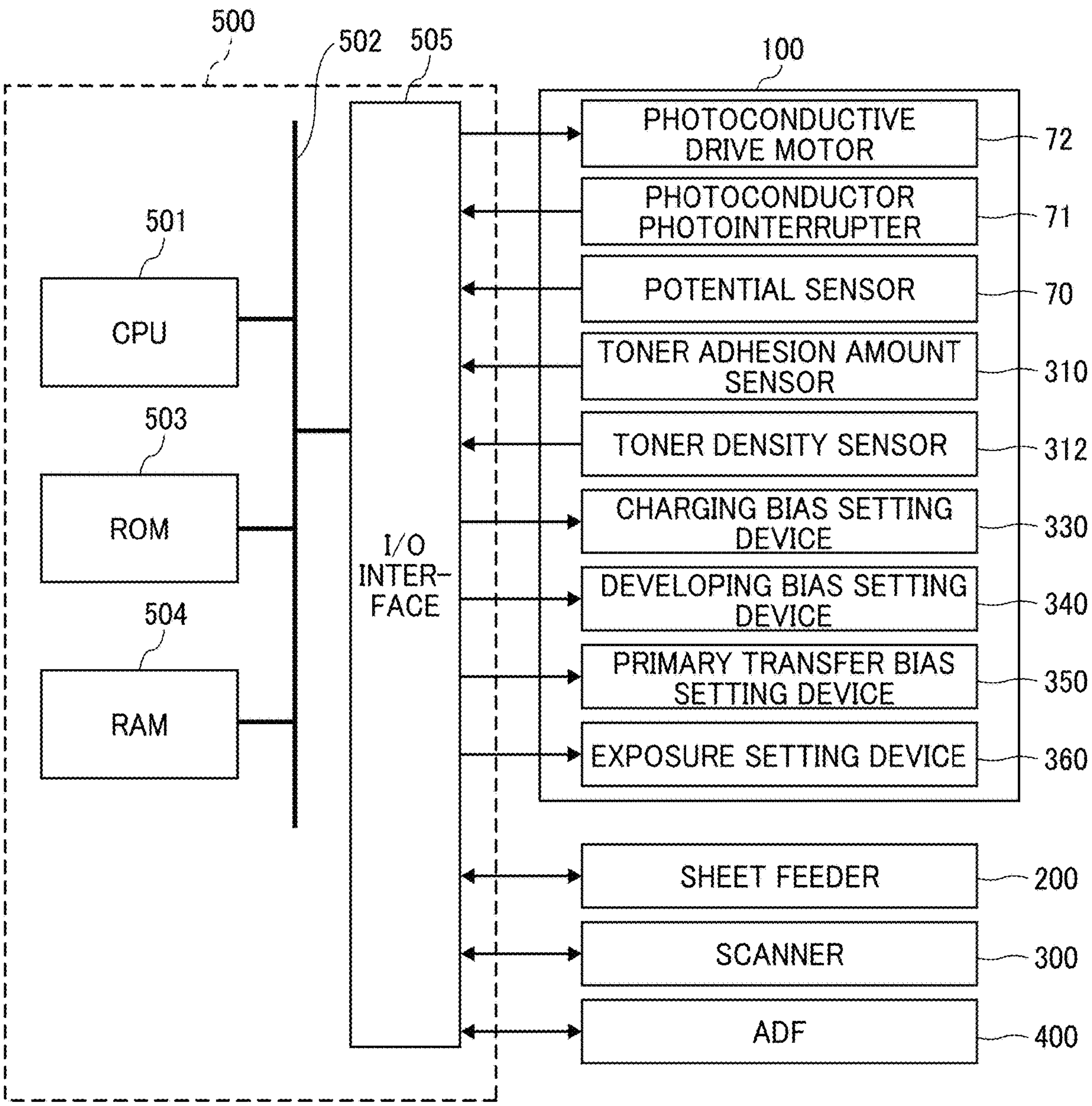
FIG. 4 is a block diagram illustrating an example of a configuration of a main part of a control system in the image forming apparatus of FIG. 1.

FIG. 4 is a block diagram illustrating an example of a main configuration of a control system in the image forming apparatus 1 according to the present embodiment. The image forming apparatus 1 includes a controller 500 as control circuitry formed of a computer device such as a microcomputer. The controller 500 functions as a control device that performs image quality adjustment control of adjusting the image quality of the output image by controlling a photoconductor drive motors 72 and the like provided in each of the image forming units 18 (Y, M, C, and K) according to the input image information. The image quality adjustment control of the present embodiment includes at least control of the photoconductor drive motors 72 (Y, M. and C) so as to match image-density cycle fluctuations generated in the rotation cycles of the photoconductors 40 in the image forming units 18 (Y, M, and C).

The controller 500 includes a central processing unit (CPU) 501. The controller 500 also includes a read only memory (ROM) 503 and a random access memory (RAM) 504 as a storage member, which is connected to the CPU 501 via a bus line 502, and an I/O interface unit 505. The CPU 501 executes various operations and drive control of each part by executing control programs which are computer programs incorporated in advance. The ROM 503 stores fixed data such as computer programs and data for control in advance. The RAM 504 functions as a work area. e.g., that rewritably stores various data.

Various sensors such as the toner adhesion amount sensor 310, the toner concentration sensor 312, and the potential sensor 70 of the apparatus body (printer unit) 100 are connected to the controller 500 via the V/O interface unit

505. Here, various sensors such as the toner adhesion amount sensor 310, the toner concentration sensor 312, and the potential sensor 70 send information detected by themselves to the controller 500. In addition, a charging bias setting device (charging bias power supply) 330 that applies a predetermined charging bias to the charging roller of the charging device 60 is connected to the controller 500 via the I/O interface unit 505. A developing bias setting device (developing bias power supply) 340 that applies a predetermined developing bias to the developing roller 61*a* of the developing device 61 is connected to the controller 500.

A primary transfer bias setting device (primary transfer bias power supply) 350 that applies a predetermined primary transfer bias to the primary transfer rollers of the primary transfer devices 62 (Y, M, C, and K) is connected to the controller 500 via the I/O interface unit 505. An exposure setting device (light source power supply) 360 that applies a predetermined voltage or supplies a predetermined current to a light source of the exposure device 21 is connected to the controller 500.

The sheet feeder 200, the scanner 300, and the automatic document feeder 400 are connected to the controller 500 via the I/O interface unit 505. The controller 500 controls each component on the basis of control target values of image formation conditions (for example, charging bias, developing bias, exposure light amount, primary transfer bias, and the like).

The ROM 503 or the RAM 504 holds, for example, a conversion table storing information regarding conversion of an output value of the toner adhesion amount sensor 310 to a toner adhesion amount per unit area. The ROM 503 or the RAM 504 stores control target values of image formation conditions (for example, charging bias, developing bias, exposure light amount, and primary transfer bias) of the image forming units 18 (Y, M, C, and K) in the image forming apparatus 1.

Instead of a computer device such as a microcomputer, the controller 500 may be configured using an IC or the like as a semiconductor circuit element manufactured for control in the image forming apparatus 1, for example.

The photoconductor 40, which is an image bearer used in the image forming apparatus 1, is molded in a cylindrical shape, but has a deflected shape rather than a perfect cylindrical shape due to variations in components generated during molding. Such component variations causes image-density cycle fluctuation with one rotation of the photoconductor 40 on the image as one cycle at the time of image formation in the image forming apparatus. Therefore, in the present embodiment, the developing bias and the charging bias as the image formation conditions are cyclically changed with the rotation cycle of the photoconductor, thereby to reduce the image-density cycle fluctuation with one rotation of the photoconductor 40 as one cycle.

In the present embodiment, the surface potential on the surface of the photoconductor caused by applying the charging bias to the photoconductor 40 by the charging device 60 that is a charging bias applying unit is called charging potential. The potential of the electrostatic latent image after exposure of the charged surface of the photoconductor 40 by the write exposure L from the exposure device 21 is called exposure potential. The surface potential on the surface of the developing roller 61*a* caused by applying the developing bias by the developing roller 61*a* of the developing device 61 is called development potential, and the difference between the development potential and the exposure potential is called developing potential.

Toner has a charge amount according to its state and environment. The toner borne on the developing roller 61*a* of the developing device 61 moves to the electrostatic latent image on the photoconductor 40 so as to offset the potential corresponding to the developing potential. Therefore, the amount of toner adhering to the electrostatic latent image on the photoconductor 40 varies depending on the toner charge amount and the developing potential.

The difference between the charging potential and the development potential is called background potential. If the background potential is too small, the toner adheres to a part other than the electrostatic latent image to cause background staining. Therefore, the background staining can be improved by changing the image formation conditions so as to increase the background potential.

Here, how the correction of the development potential, charging potential, and exposure potential affects the developing potential and the background potential will be described.

First, the correction of the development potential affects the developing potential and the background potential. The correction of the charging potential affects the background potential but does not significantly affect the developing potential. The correction of the exposure potential affects the developing potential but does not significantly affect the background potential. In view of this, the background potential can be increased by increasing the charging potential. Therefore, the background staining can be decreased by increasing the charging potential. The background staining can be improved by reducing the development potential. If both the charging potential and the developing potential are changed to increase the difference between the charging potential and the developing potential, the background potential can be increased to decrease the background staining.

Figure 5:
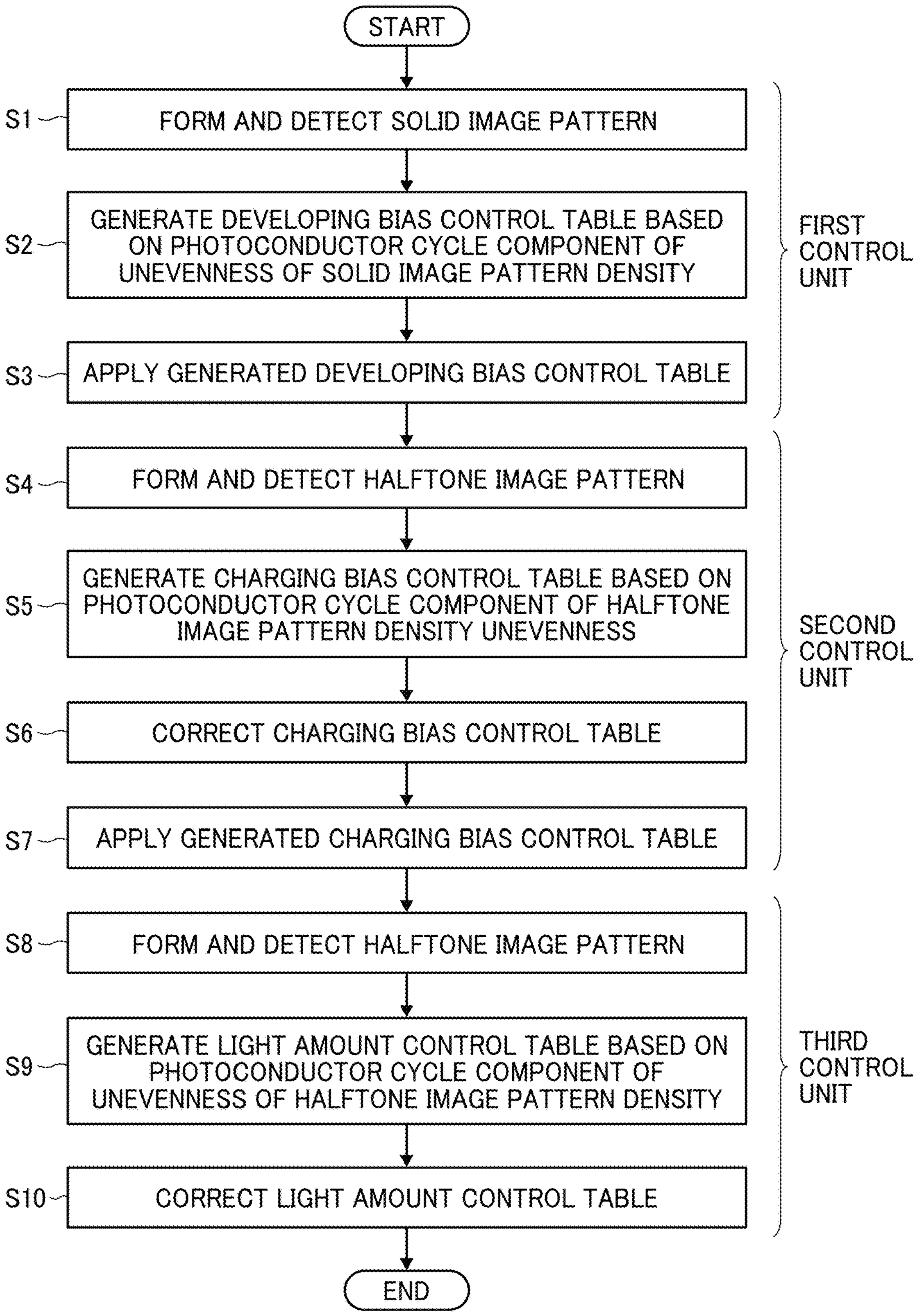
FIG. 5 is a flowchart illustrating an example of image-density fluctuation-reduction control of the image forming apparatus of FIG. 1.

FIG. 5 is a flowchart illustrating an example of the image-density fluctuation-reduction control for reducing the image-density cycle fluctuation. The image-density fluctuation-reduction control includes first control in which to determine a first image formation condition for reducing the image-density cycle fluctuation of a high-density image part, second control in which to determine a second image formation condition for reducing the image-density cycle fluctuation of a low-density image part, and third control in which to determine a third image formation condition. This is because the image-density cycle fluctuation vanes depending on the density of the image to be formed (for example, a solid image or a halftone image). Specifically, in a high-density image part such as a solid image, the potential difference between the post-exposure potential and the developing bias, that is, the developing potential is dominant. On the other hand, in a halftone image part and a low-density image part, the potential difference between the pre-exposure potential of the photoconductor and the developing bias, that is, the background potential is dominant. Therefore, if the developing bias is cyclically changed so as to correct the density unevenness in the high-density image part, the density unevenness may be rather deteriorated in the low-density part such as a halftone.

This is because the toner adhesion amount of the halftone or the highlight part changes due to the cycle fluctuation of the background potential caused by the cycle fluctuation of the developing bias. Therefore, in the present embodiment, after the first control is performed to determine the first image formation condition (developing bias) for reducing the image-density cycle fluctuation of the high-density image part, the second control is performed to determine the second image formation condition (charging bias) for reducing the image-density cycle fluctuation of the low-density image part. Further, the third control is performed to determine the third image formation condition (exposure light amount) for reducing the image-density cycle fluctuation of the low-density image part. This makes it possible to reduce the cycle fluctuation of the image densities of the high-density image part and the low-density image part.

In the first control (S1 to S3), first, a toner image of image pattern with high density (high-density image pattern) is formed on each photoconductor 40 (Y, M, C, K) (see FIGS. 6A and 6B described later). Then, the density (toner adhesion amount) of the toner image is detected on the intermediate transfer belt 10 by the toner adhesion amount sensor 310. The density (toner adhesion amount) of the toner image is detected while the rotation position of each photoconductor 40 (Y, M, C, K) is detected by the photointerrupter 71 (Y, M, C, K).

Next, using the toner adhesion amount detection signals (toner image density detection signals) detected by the toner adhesion amount sensors 310 and the rotation position signals of the photoconductors 40 detected by the photointerrupters 71, phase information and amplitude information of the image density fluctuation in one rotation cycle of the photoconductors are obtained. Then, a developing bias control table for cyclically changing the developing bias as the first image formation condition is created from the phase information and the amplitude information. The developing bias control table includes a control target value of the developing bias at the rotational position of the photoconductor 40 (Y, M, C, K). The controller 500 cyclically changes the developing bias by controlling the developing bias on the basis of the control table. The developing bias control table created in this manner is stored in the controller 500.

The second control (S4 to S7) is executed subsequent to the first control (S1 to S3). In the second control, the developing bias control table obtained in the first control is applied, and toner image of second image pattern (halftone image pattern) having a predetermined density is formed on each photoconductor 40 (Y, M. C. K) with a cycle change in the developing bias. Then, the density (toner adhesion amount) of the toner image of the second image pattern on each photoconductor is detected by the toner adhesion amount sensor 310 on the intermediate transfer belt 10. The density (toner adhesion amount) of the toner image is also detected while the rotation position of each photoconductor 40 (Y, M, C, K) is detected by the photointerrupter 71 (Y, M, C, K).

Next, using the toner adhesion amount signal (toner image density detection signal) detected by the toner adhesion amount sensor 310 and the rotation position signal of the photoconductor 40 detected by the photointerrupter 71, phase information and amplitude information of the image density fluctuation in one rotation cycle of the photoconductor are obtained. Then, a charging bias control table for cyclically changing the charging bias as the second image formation condition is created from the phase information and the amplitude information. The charging bias control table includes control target value of the charging bias at the rotational position of the photoconductor 40 (Y, M, C, K). The controller 500 cyclically changes the charging bias by controlling the charging bias on the basis of the control table.

Next, the created charging bias control table is corrected. This correction is performed according to the density unevenness detected for the toner image of the first image pattern in the first control. Specifically, the generated charging bias control table is corrected on the basis of the density unevenness phase information and the density unevenness amplitude information in the first control. The charging bias control table after the correction is set as a charging bias control table to be applied to an image forming operation (printing), and is stored in the controller 500.

The third control (S8 to S10) is executed subsequent to the second control (S4 to S7). In the third control, a toner image of a third image pattern (halftone image pattern) is formed on each photoconductor 40 (Y, M, C, K) in a state where the developing bias control table and the charging bias control table are applied. In the same manner as described above, the density (toner adhesion amount) of the toner image of the third image pattern is detected by the toner adhesion amount sensor 310. Next, using the toner adhesion amount signal (toner image density detection signal) detected by the toner adhesion amount sensor 310 and the rotation position signal of the photoconductor 40 detected by the photointerrupter 71, phase information and amplitude information of the image density fluctuation in one rotation cycle of the photoconductor are obtained. Then, from the phase information and the amplitude information, a third image formation condition for each rotational position of the photoconductor 40 (Y, M, C, K), specifically, a control table for cyclically changing the exposure light amount for exposing the photoconductor 40 (Y, M, C, K) at each rotational position is created. The exposure light amount is cyclically changed using the created control table.

Figure 6A:
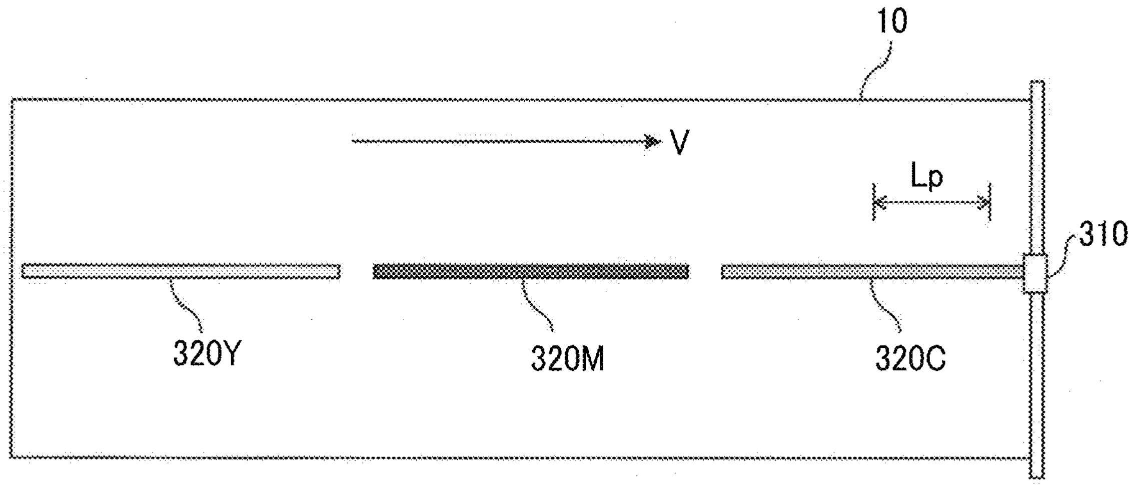
FIG. 6A is a diagram illustrating examples of image patterns used in first control.
Figure 6B:
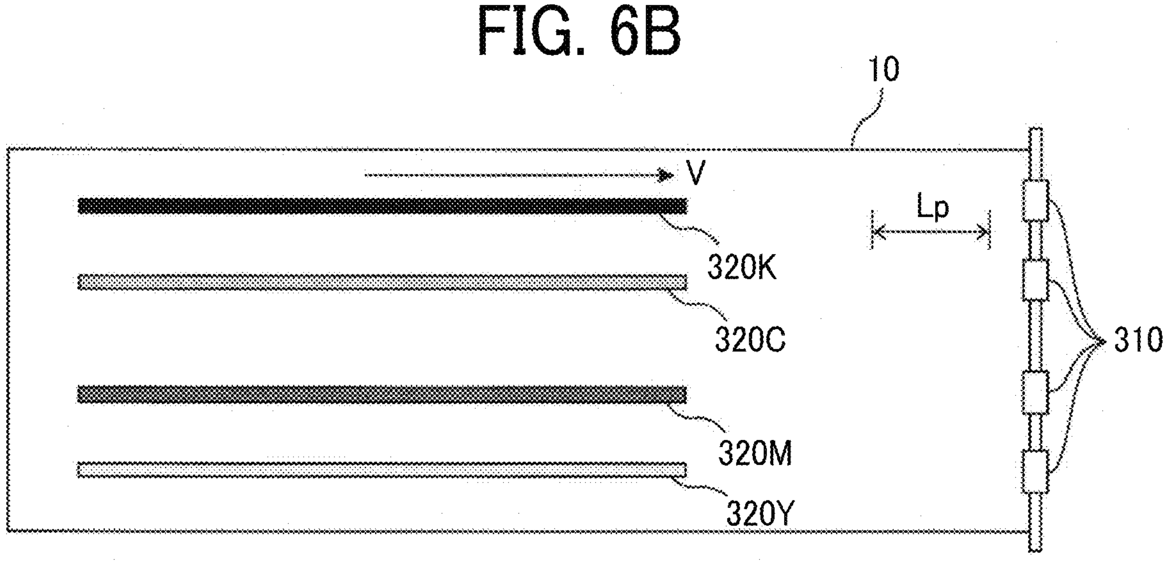
FIG. 6B is a diagram illustrating examples of image patterns used in second control.

FIGS. 6A and 6B are diagrams for describing examples of image patterns used in the first to third control described with reference to FIG. 5. FIG. 6A is an explanatory diagram illustrating an example of an image pattern detected using only the toner adhesion amount sensor 310 (central sensor head) disposed at the center in the width direction of the intermediate transfer belt 10. In this example, in the detection area of the toner adhesion amount sensor 310 (central sensor head), a toner image of a belt-like image pattern 320 (Y, M, C, K) at a single density of each color extending in a belt movement direction V is sequentially formed. Then, the toner adhesion amount (uneven density of the toner image) of the belt-like image pattern 320 (Y, M, C, K) at a single density of each color is detected by the toner adhesion amount sensor 310. The length of each image pattern 320 (Y, M, C, K) in the belt movement direction V is set to a length of at least one cycle of a circumferential length Lp of the photoconductor 40 and the circumferential length of the developing roller 61*a* for each color in order to calculate variation in image density unevenness information described later. The length of each image pattern 320 (Y, M, C, K) in the belt movement direction V may be a length of two or more cycles of at least the circumferential length Lp of the photoconductor 40 and the circumferential length of the developing roller 61*a* for each color. In this example, since only one sensor is used, an advantage of cost reduction can be expected.

FIG. 6B is an explanatory diagram illustrating an example of an image pattern detected using the plurality of toner adhesion amount sensors 310 (sensor heads). In this example, in each of the detection areas of the plurality of toner adhesion amount sensors 310 (sensor heads), a toner image of a belt-like image pattern 320 (Y, M, C, K) at a single density of each color extending in a belt movement direction V is sequentially formed. The density unevenness of the toner image of the belt-like image pattern 320 (Y, M, C, K) at a single density of each color is detected by the corresponding toner adhesion amount sensor 310. In this example, since the image patterns of the respective colors are detected in parallel, an advantage of shortening the detection time can be expected.

Also in this case, as in the example of FIG. 6A, each image pattern 320 (Y, M, C, K) is a belt-like single density pattern, and has a length of one cycle or more of at least the circumferential length Lp of the photoconductor and the circumferential length of the developing roller for each color. The length of each image pattern 320 (Y, M, C, K) in the belt movement direction V may also be a length of two or more cycles of at least the circumferential length Lp of the photoconductor 40 and the circumferential length of the developing roller 61*a* for each color.

In the present embodiment, the first image pattern used in the first control is formed as a band pattern having a high-image density in which the image density is high. The second image pattern and the third image pattern used in the second control and the third control are formed as halftone image patterns which are halftone band patterns so as to form a halftone part having an image density lower than that of the first image pattern.

The first image pattern is an image pattern having an image density of about 100% so that the image density fluctuation on the side where the image density becomes higher is not saturated. However, but the first image pattern may be a solid image as long as the image density fluctuation can be detected. On the other hand, the second image pattern is an image pattern having an image density of 30%. The third image pattern is an image pattern having an image density of 50%.

The image-density fluctuation-reduction control is similar to the method disclosed in Japanese Patent No. 6115209 whose corresponding U.S. Patent Application Publication is US2014-0268242-A1 or Japanese Unexamined Patent Application Publication No. 2017-173357 whose corresponding U.S. Patent Application Publication is US2017-0269527-A1. Therefore, for example, the method disclosed in Japanese Patent No. 6115209 or Japanese Unexamined Patent Application Publication No. 2017-173357 may be used as a specific method for acquiring the density unevenness phase information and the density unevenness amplitude information.

Figure 7:
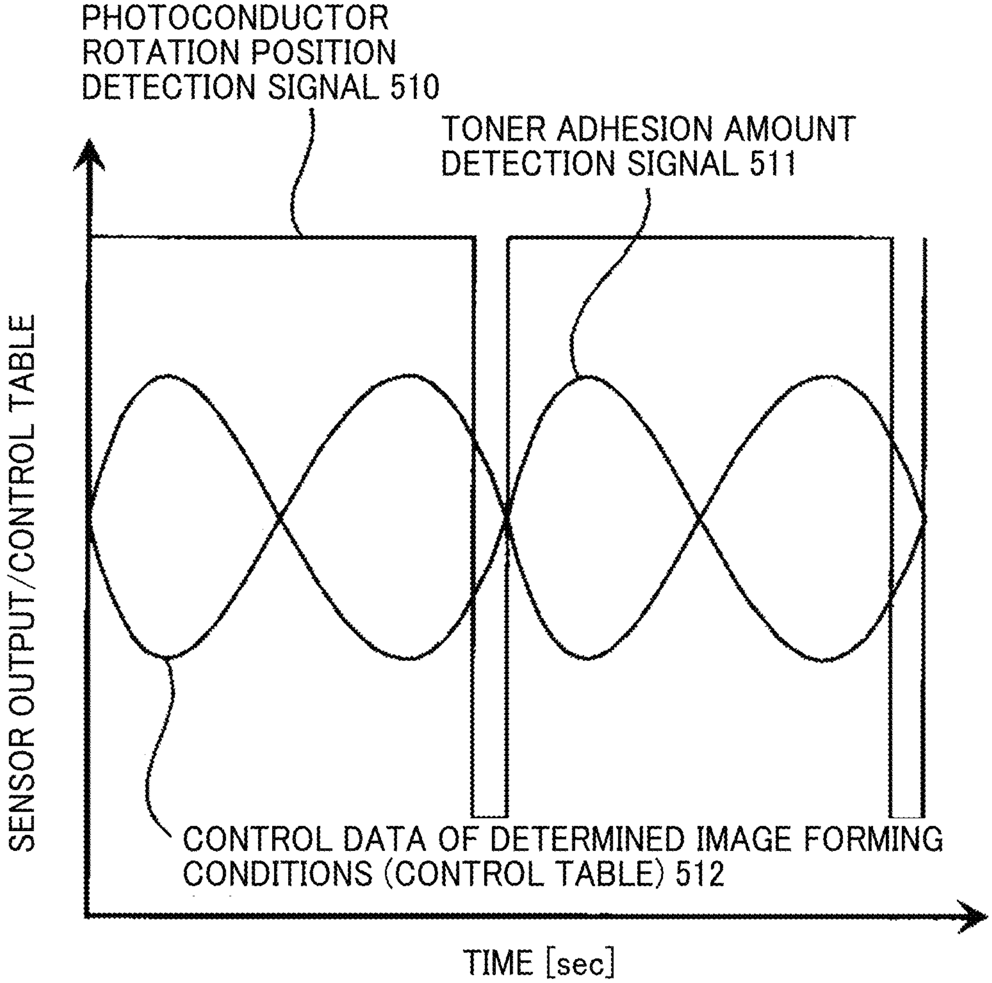
FIG. 7 is a diagram illustrating a method of applying image formation conditions in the first control and the second control.

FIG. 7 is a diagram for describing an application method of respective control tables acquired in the first control and the second control described with reference to FIG. 5. FIG. 7 illustrates an example of the relationship between a rotation position detection signal 510 and a toner adhesion amount detection signal 511 at the time of formation of a predetermined image pattern and a control table 512 of the image formation conditions determined by the controller 500 based on these signals 510 and 511. FIG. 7 illustrates an example of measurement of the signals for two cycles of the photoconductor 40. The toner adhesion amount detection signal 511 fluctuates in the same cycle as the cycle of the rotation position detection signal 510. A control table 512 of image formation conditions (developing bias and charging bias) with respect to the rotational position of the photoconductor 40 is created so as to be in "opposite phase" (cycle fluctuation with a phase shift of 180°) to the toner adhesion amount detection signal 511. As described above, the developing bias and the charging bias are cyclically changed using the created control table 512.

In the present embodiment, after the second control, the third control of determining the control data of the exposure light amount as the control data of the third image formation condition is performed. In the third control, as described above, a toner image of a third image pattern (halftone image pattern) is formed on each photoconductor 40 (Y, M, C, K) in a state where the developing bias control table and the charging bias control table are applied. In the same manner as described above, the density (toner adhesion amount) of the toner image of the third image pattern is detected by the toner adhesion amount sensor 310. Next, using the toner adhesion amount signal (toner image density detection signal) detected by the toner adhesion amount sensor 310 and the rotation position signal of the photoconductor 40 detected by the photointerrupter 71, phase information and amplitude information of the image density fluctuation in one rotation cycle of the photoconductor are obtained. Then, from the phase information and the amplitude information, a third image formation condition for each rotational position of the photoconductor 40 (Y, M, C, K), specifically, a control table for cyclically changing the exposure light amount for exposing the photoconductor 40 (Y, M, C, K) at each rotational position is created. The exposure light amount is cyclically changed using the created control table. As a result, the image-density cycle fluctuation (amplitude) generated in the photoconductor rotation cycle can be reduced.

The image-density fluctuation-reduction control is performed immediately after the photoconductor is set (initial setting, replacement, detachment, or the like), for example. When the photoconductor 40 is detached from the apparatus body 100, there is a high possibility that the situation of occurrence of the image-density cycle fluctuation in the photoconductor cycle changes. In the case of replacement of the photoconductor, a new photoconductor is different from the photoconductor that has been used so far, in the deflection characteristic and in the image-density cycle fluctuation in one rotation cycle of the photoconductor 40. In addition, a new photoconductor is also different from the photoconductor that has been used so far, in the relationship between the deflection characteristic of the photoconductor 40 and the part 71*a* to be detected and in the phase of the image-density cycle fluctuation.

In addition, even in the case of simply detaching the photoconductor for maintenance, there is a possibility of a change in the attachment situation of the photoconductor (a change in the shift of the photoconductor shaft with respect to the rotation axis direction) occurring due to the detachment of the photoconductor. For the above reasons, it is preferable to execute the image-density fluctuation-reduction control immediately after the photoconductor 40 is set.

It is preferable to similarly execute the image-density fluctuation-reduction control with a change in the environmental conditions in the apparatus. Among the environmental conditions, if the temperature condition changes in particular, the photosensitive element tube expands and contracts according to the thermal expansion coefficient of the photosensitive element tube. For this reason, the outer profile of the photoconductor 40 changes, and the situation of the development gap fluctuation changes, so that the image-density cycle fluctuation may change. The trigger for executing the image-density fluctuation-reduction control may be the occurrence of a temperature change of N [deg] or more as compared with the time of the previous image-density fluctuation-reduction control, for example. Similarly, the image-density fluctuation-reduction control may be executed at intervals during which a certain number of sheets is printed.

When the phases of the image-density cycle fluctuations of the individual colors are different from each other in the formation of a full-color image, the cycle fluctuation of the color tone may occur in the full-color image. To reduce the cycle fluctuation of the color tone in the full-color image, it is preferable to include a phase control unit to execute phase matching control for matching the phases of image-density cycle fluctuations of the image forming units on a recording medium, based on the image-density cycle fluctuations of the image forming units acquired by an image-density cycle-fluctuation acquiring unit.

Figure 8A:
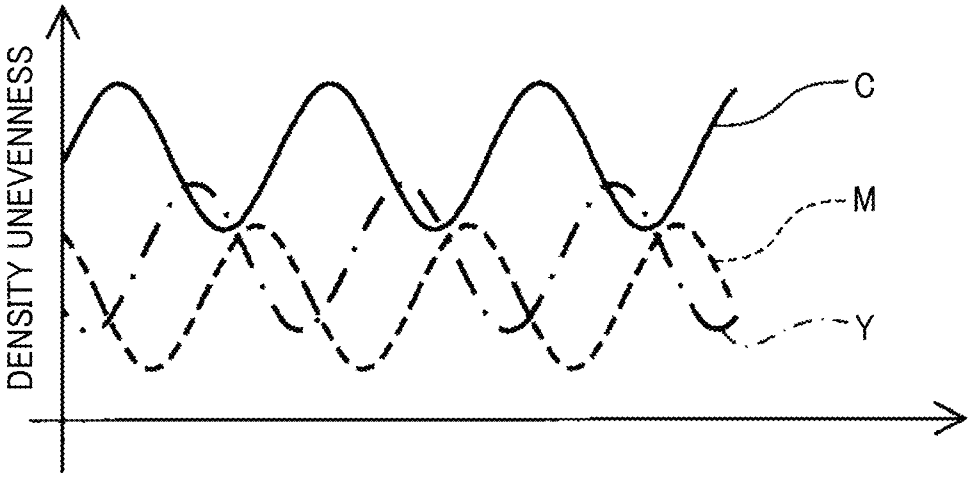
FIG. 8A is a graph illustrating image-density cycle fluctuations of Y color, image-density cycle fluctuations of M color, and image-density cycle fluctuations of C color.
Figure 8B:
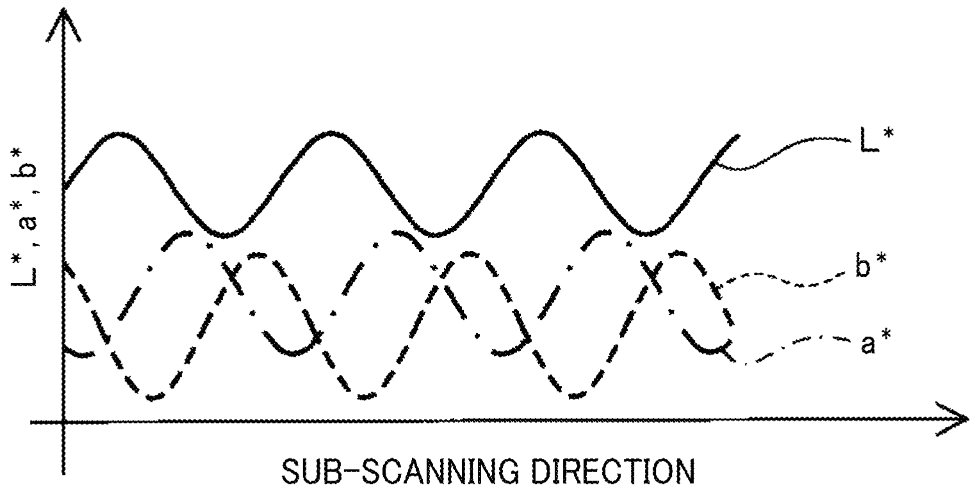
FIG. 8B is a graph illustrating brightness L*, chromaticity a* and b* in the sub-scanning direction of a 3C gray image formed by superimposing images of Y, M, and C colors.

FIG. 8A is a graph illustrating image-density cycle fluctuation of Y color, image-density cycle fluctuation of M color, and image-density cycle fluctuations of C color; FIG. 8B is a graph illustrating brightness L*, chromaticity a* and b* in the sub-scanning direction of a 3C gray image formed by superimposing images of Y, M, and C colors. If a color image is formed in a state in which the phases of the image-density cycle fluctuations of the individual colors are different from each other as illustrated in FIG. 8A, the brightness L*, the chromaticity a* and b* of the image cyclically fluctuates as illustrated in FIG. 8B. In particular, the cycle fluctuations of the chromaticity a* and b* mean that the color tone of the color image cyclically changes, and such cycle fluctuation of the color tone has high visual sensitivity and is often pointed out as an anomality in the image.

As for the chromaticity a*, the M color fluctuates in the positive direction when the density is high, and the Y and C colors fluctuate in the negative direction when the density is high. As for the chromaticity b*, the Y color fluctuates in the positive direction when the density is high, and the M and C colors fluctuate in the negative direction when the density is high. As for the K color, the chromaticity a* and b* do not cyclically fluctuate even if there is an image-density cycle fluctuation with one rotation of the photoconductor as one cycle. Therefore, in the present embodiment, the phase matching control for matching the phase of the image-density cycle fluctuation is performed to reduce deterioration in the image quality due to a change in color tone.

Figure 9:
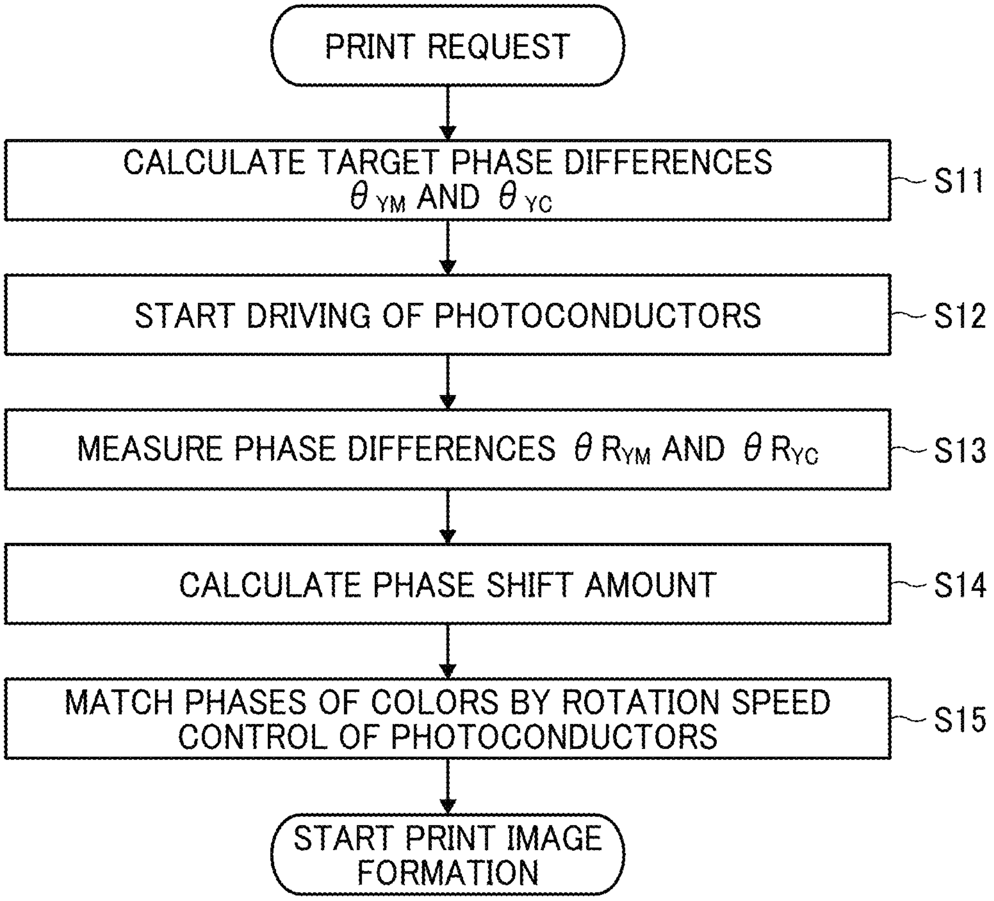
FIG. 9 is a flowchart illustrating an example of phase matching control of the image forming apparatus of FIG. 1.

FIG. 9 is a flowchart illustrating an example of the phase matching control of residual image density fluctuation of Y, M, and C colors. In this example, phase matching of the image-density cycle fluctuations is performed with reference to Y color, but the reference color may be M color or C color. When a print request is made, the controller 500 first calculates a target phase difference $\theta_{YM}$ and a target phase difference $\theta_{YC}$ (S11). The target phase difference $\theta_{YM}$ is a phase difference between the rotation position signal of the Y color photoconductor 40Y and the rotation position signal of the M color photoconductor 40M when the phases of the image-density cycle fluctuations of Y, M, and C coincide with one another. The target phase difference $\theta_{YC}$ is a phase difference between the rotation position signal of the Y color photoconductor and the rotation position signal of the C color photoconductor when the phases of the image-density cycle fluctuations of Y, M, and C coincide with one another.

A photoconductor movement distance from the developing position of the Y color to the primary transfer position is designated as $L_Y$, and a photoconductor movement distance from the developing position of the M color to the primary transfer position is designated as $L_M$. In addition, the distance (inter-drum pitch) from the primary transfer position of the Y color to the primary transfer position of the M color is divided by the peripheral length of the photoconductor to obtain a value $L_1$ that cannot be divided. The phase of the image-density cycle fluctuation of the Y color is designated as Oy, and the phase of the image-density cycle fluctuation of the M color is designated as OM. With the rotation speed of the photoconductor 40 designated as V, the target phase difference $\theta_{YM}$ can be calculated by the following equation (1):

$$\theta_{YM}=|V(\theta_Y-\theta_M)|+(L_Y+L_1-L_M) \quad (1)$$

In addition, the photoconductor movement distance from the developing position of the C color to the primary transfer position is designated as $L_C$, and the distance (inter-drum pitch) from the primary transfer position of the Y color to the primary transfer position of the C color is divided by the peripheral length of the photoconductor to obtain a value $L_2$ that cannot be divided. With the phase of the image-density cycle fluctuation of the C color designated as $\theta_C$, the target phase difference $\theta_{YC}$ can be calculated by the following equation:

$$\theta_{YC}=|V(\theta_Y-\theta_C)|+(L_Y+L_2-L_M) \quad (2)$$

If the inter-drum pitch is an integral multiple of the peripheral length of the photoconductor and the photoconductor movement distance from the development position to the primary transfer position is the same for Y, M, and C colors, the target phase difference $\theta_{YM}$ and the target phase difference $\theta_{YC}$ can be calculated using only the phases $\theta_Y$, $\theta_M$, and $\theta_C$ of the image-density cycle fluctuations. If the values calculated by the equations (1) and (2) exceed the circumferential length of the photoconductor, the circumferential length of the photoconductor is subtracted such that the values become equal to or less than the circumferential length of the photoconductor.

The phase information acquired by the image-density fluctuation-reduction control can be used for the phases $\theta_Y$, $\theta_M$, and $\theta_C$ of the image-density cycle fluctuations of the Y, M, and C colors. In addition, the developing bias control table and the charging bias control table are applied to cyclically change the developing bias and the charging bias. As a result, toner images of image patterns may be formed on the photoconductors 40 (Y, M, C) of Y, M, and C colors, and the phase information and the amplitude information of the image-density cycle fluctuation may be reacquired. The image pattern at this time is preferably a halftone image pattern that is highly visible to the user. Setting the image pattern to halftone makes it possible to reduce the color-tone fluctuation of the halftone that is most desired to be reduced. The image pattern at this time may be an image pattern with high image density. An image with high image density has a large variation in the amount of toner adhesion, which provides an advantage that phase information of image density fluctuation can be accurately detected.

Next, the photoconductor drive motors 72 (Y, M, C) are controlled to drive the photoconductors of Y, M, and C colors at the same rotational speed (S12). Then, a phase difference $\theta R_{YM}$ of the rotation position signal of the M color photoconductor with respect to the actual rotation position signal of the Y color photoconductor and a phase difference $\theta R_{YC}$ of the C color photoconductor rotation position signal with respect to the Y color photoconductor position signal are obtained (S13).

The phase difference $\theta R_{YM}$ can be obtained from the time from when the Y color photointerrupter 71 detects the part 71*a* to be detected which is at the rotation reference position to when the M-color photointerrupter 71 detects the part 71*a* to be detected and from the rotation speed V of the photoconductor.

The phase difference $\theta R_{YC}$ can be obtained from the time from when the Y-color photointerrupter 71 detects the part 71*a* to be detected which is at the rotation reference position to when the C-color photointerrupter 71 detects the part 71*a* to be detected and from the rotation speed V of the photoconductor. The time measurement described above may be performed a plurality of times, and the phase differences $\theta R_{YM}$ and $\theta R_{YC}$ may be obtained from the average value.

Next, a phase shift amount (adjustment amount) $Z_{YM}$ is calculated by subtracting the measured phase difference $\theta R_{YM}$ from the target phase difference $\theta_{YM}$ obtained by the above equation (1). Similarly, a phase shift amount (adjustment amount) $Z_{YC}$ is calculated from the target phase difference $\theta_{YC}$ obtained by the above equation (2) and the measured phase difference $\theta R_{YC}$ (S14).

Then, on the basis of the calculated phase shift amounts $Z_{YM}$ and $Z_{YC}$, the photoconductor drive motors 72 of Y, M, and C are controlled to rotate the photoconductors of Y, M, and C at a predetermined rotation speed for a predetermined specified period to match the phases of the image-density cycle fluctuations of Y, M, and C (S15).

Assuming that the rotation speed of the Y-color photoconductor is $V_Y$ and the specified period is T, a rotation speed $V_M$ of the M-color photoconductor 40M at the time of phase matching control can be expressed by the following equation (3), and a rotation speed $V_C$ of the C-color photoconductor 40C can be expressed by the following equation (4):

$$V_M = V_Y + (Z_{YM}/T) \quad (3)$$

$$V_C = V_Y + (Z_{YC}/T) \quad (4)$$

As can be seen from the equations (3) and (4), if the calculated phase shift amounts $Z_{YM}$ and $Z_{YC}$ are negative, the rotation speeds are decelerated with respect to the rotation speed of the Y-color photoconductor, and if the calculated phase shift amounts $Z_{YM}$ and $Z_{YC}$ are positive, the rotation speeds are accelerated with respect to the rotation speed of the Y-color photoconductor.

Figure 10:
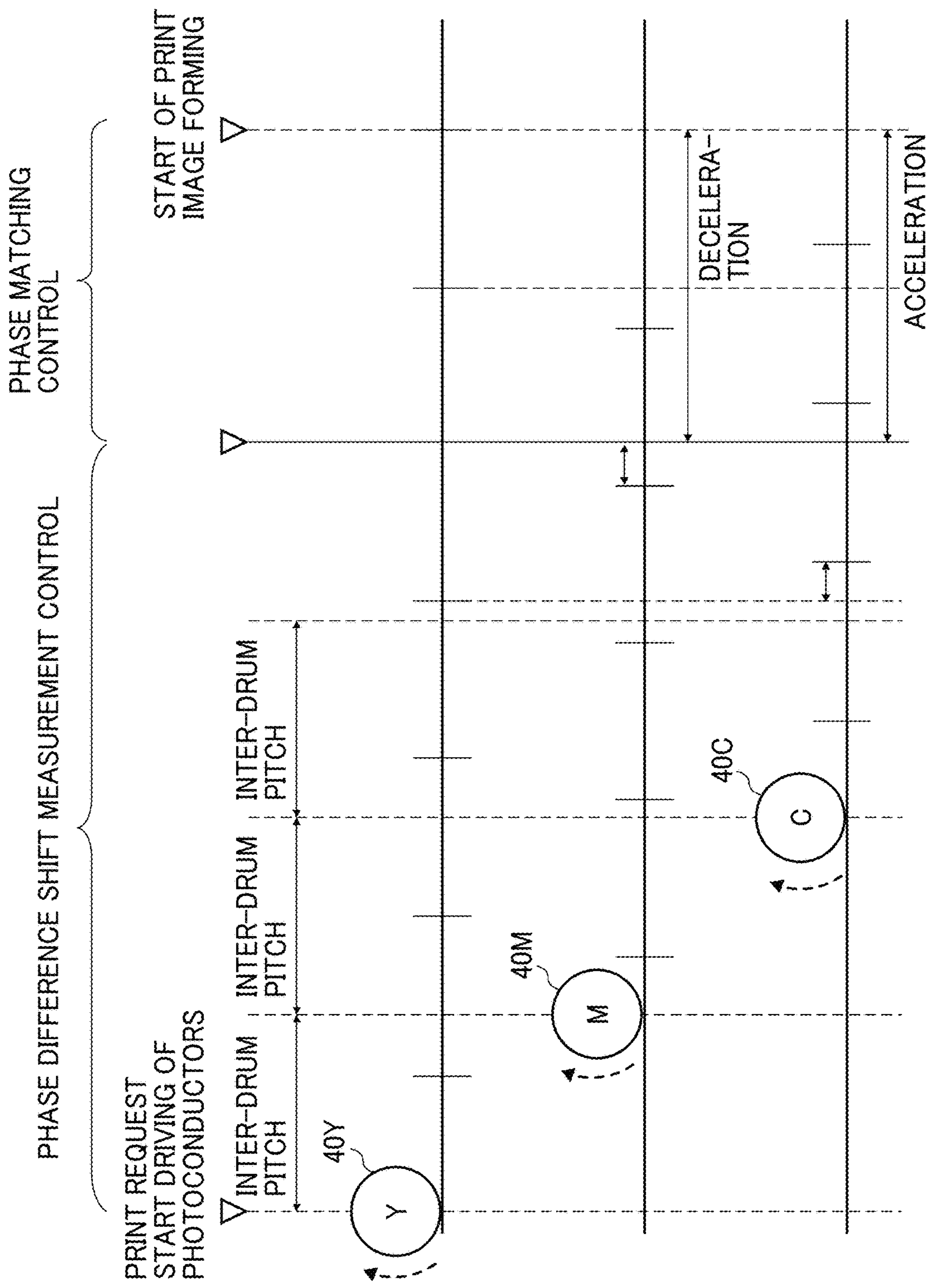
FIG. 10 is a sequence diagram illustrating an example of rotational drive of photoconductors of Y, M. and C colors.

FIG. 10 is a sequence diagram illustrating an example of rotational driving of photoconductors of Y, M, and C colors. As illustrated in FIG. 10, each photoconductor is driven at a predetermined timing, and a phase difference shift is measured. In this example, the photoconductors are driven at different timings, but the photoconductors may be simultaneously driven.

Then, the phase shift amounts $Z_{YM}$ and $Z_{YC}$ are calculated, and at the timing when the Y-color photointerrupter 71 detects the part 71*a* to be detected at the rotation reference position, the M-color photoconductor and the C-color photoconductor are accelerated or accelerated to perform phase matching control. In the example illustrated in FIG. 10, the rotation speeds of the M color and the C color are increased or decreased so that the phases of the image-density cycle fluctuations of the respective colors match while the photoconductor makes two rotations. In the example of FIG. 10, the rotation speed of the M color is decreased, and the rotation speed of the C color is accelerated to match the phases of the image-density cycle fluctuations of the respective colors.

In the example of FIG. 10, the M-color photoconductor is decelerated, and the C-color photoconductor is decelerated to adjust the phase difference from the image-density cycle fluctuation of Y color, which is a reference, to be 0. However, the phase difference from the image-density cycle fluctuation of the Y color may be adjusted to be 0 only by the acceleration or only by the deceleration. As described above, performing the phase matching control of the image density only by the deceleration or the acceleration has an advantage that the control can be simplified. In addition, performing the phase matching control of the image density only by deceleration makes it possible to use an inexpensive motor having a low torque as the photoconductor drive motor 72, which produces an advantage of cost reduction of the apparatus. On the other hand, performing the phase matching control of the image density only by the acceleration has an advantage that the control time for the phase matching control can be shortened as compared with the case of performing the phase matching control of the image density only by the deceleration.

In the above description, the phase matching of the image-density cycle fluctuation is performed with reference to the Y color, but a color with the smallest control amount may be used as a reference. In the above-described control, the photoconductors of the colors other than the reference color are accelerated or decelerated for a predetermined period with respect to the rotation speed of the photoconductors of the reference color, thereby to match the phases of the image-density cycle fluctuations of the Y, M, and C colors. However, the phases of the image-density cycle fluctuations of the Y, M, and C colors may be matched by shifting the drive timings of the photoconductors with respect to the photoconductor of the reference color on the basis of the calculated phase shift amount.

The photoconductors of the Y, M, and C colors may be driven and stopped at the same timing, and if the relationship among the rotational positions of the photoconductors does not change after the phase matching control of the image-density cycle fluctuations, the phase matching control of the image-density cycle fluctuations may not be performed each time printing is started. In such an apparatus, the phase matching control may be performed at a timing when the relationship among rotational positions of the photoconductors changes, such as the first printing time after the photoconductors are set in the apparatus body.

Even if the photoconductors are to be driven and stopped at the same timing, it is difficult to drive and stop the photoconductors at exactly the same timing, and there is a possibility that the positional relationship is gradually deteriorated. Therefore, the process in the flow illustrated in FIG. 9 may be performed for each specified number of sheets.

Figure 11A:
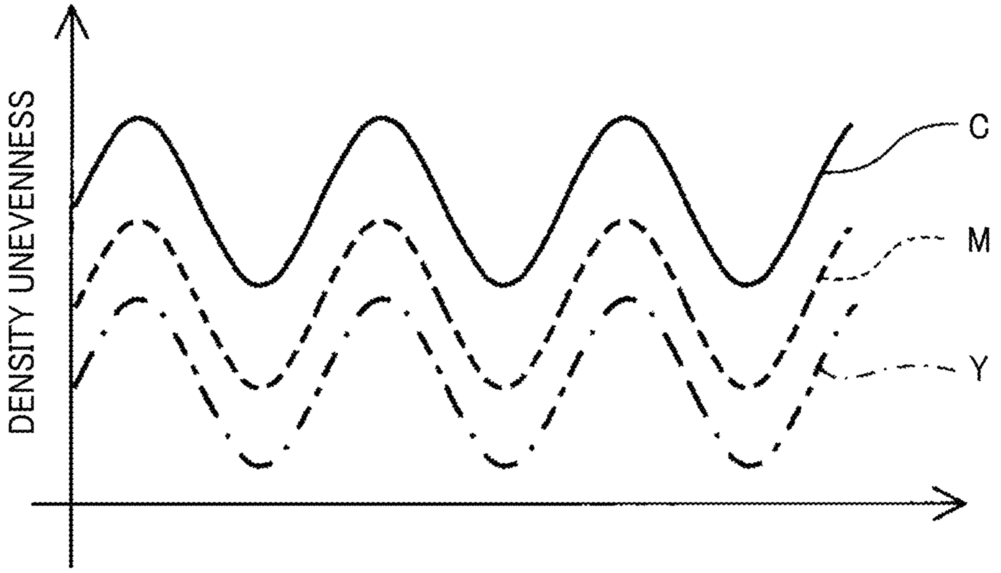
FIG. 11A is a graph illustrating image-density cycle fluctuations of Y color, image-density cycle fluctuations of M color, and image-density cycle fluctuations of C color after phase matching control.
Figure 11B:
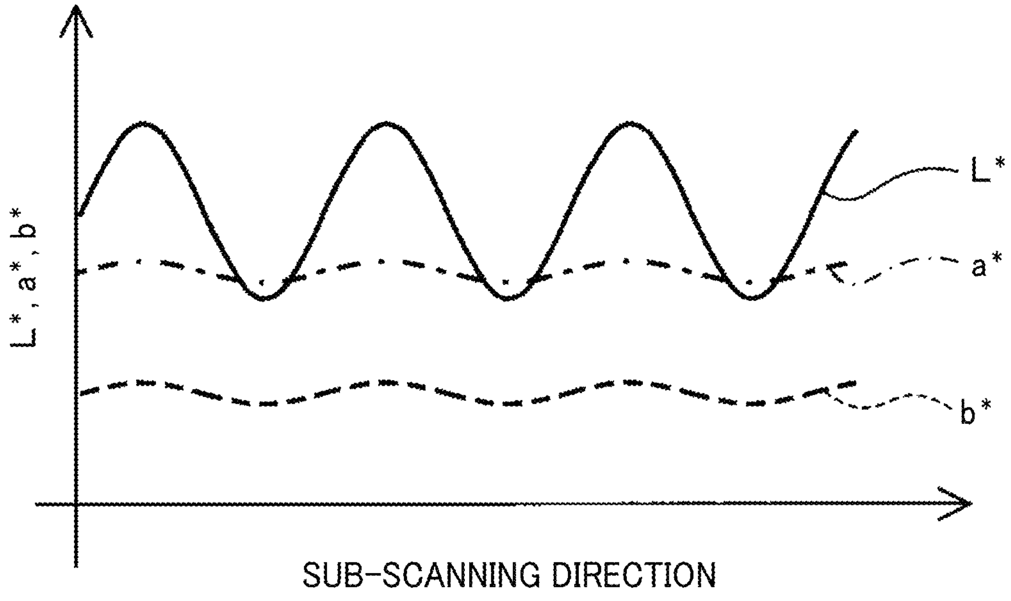
FIG. 11B is a graph illustrating brightness L*, chromaticity a* and b* in the sub-scanning direction of a 3C gray image formed by superimposing images of Y, M, and C colors after the phase matching control.

FIG. 11A is a graph illustrating the image-density cycle fluctuation of the Y color, the image-density cycle fluctuation of the M color, and the image-density cycle fluctuation of the C color after the phase matching control. FIG. 11B is a graph illustrating brightness L* and chromaticity a* and b* in the sub-scanning direction of a 3C gray image formed by superimposing Y, M, and C color images after the phase matching control. As illustrated in FIGS. 11A and 11B, it can be seen that the fluctuations of the chromaticity a* and b* are reduced by matching the phases of the image-density cycle fluctuations of Y, M, and C. Performing the phase matching of the image-density cycle fluctuations of Y, M, and C makes it possible to match the phases of the image expansion/contraction fluctuations in the rotation cycles of the photoconductors of the Y, M, and C colors caused by the photoconductor surface speed variations due to the shaking of the photoconductors. This also reduces the positional shifts of the superimposed images of the Y, M, and C colors. This also eliminates the need to create an image pattern in which a plurality of toner patches is formed at equal intervals and measure the distance between the toner patches to detect the image expansion/contraction variations, so that it is possible to decrease the toner consumption amount and reduce the downtime of the apparatus.

Figure 12A:
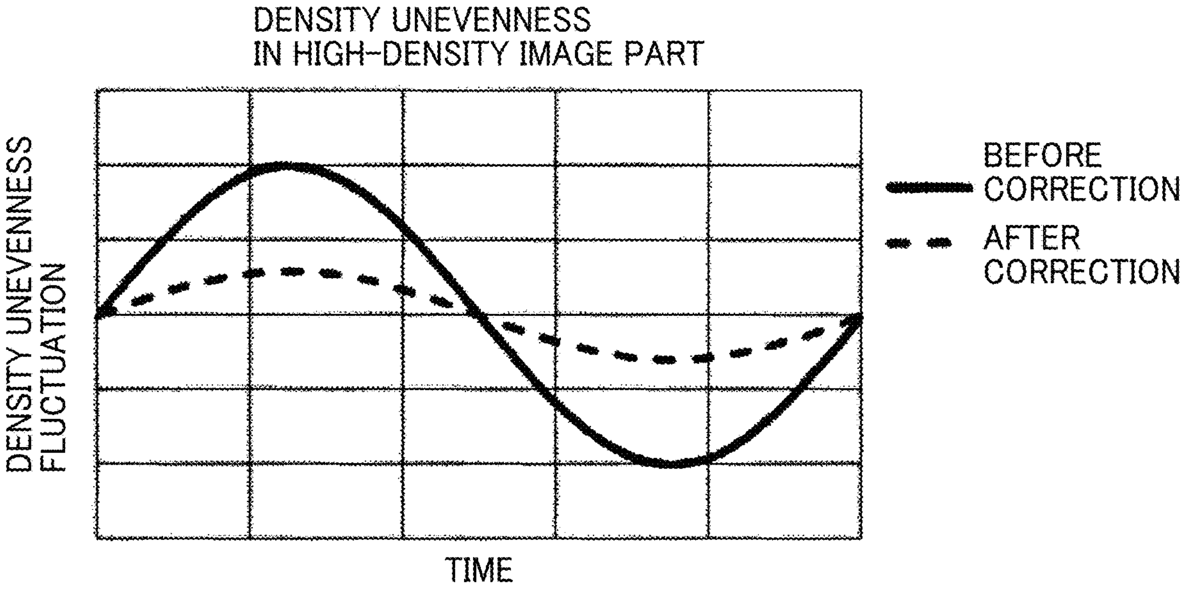
FIG. 12A is a diagram illustrating an example of image-density cycle fluctuations before and after image-density fluctuation-reduction control of a high-density image of Y color.
Figure 12B:
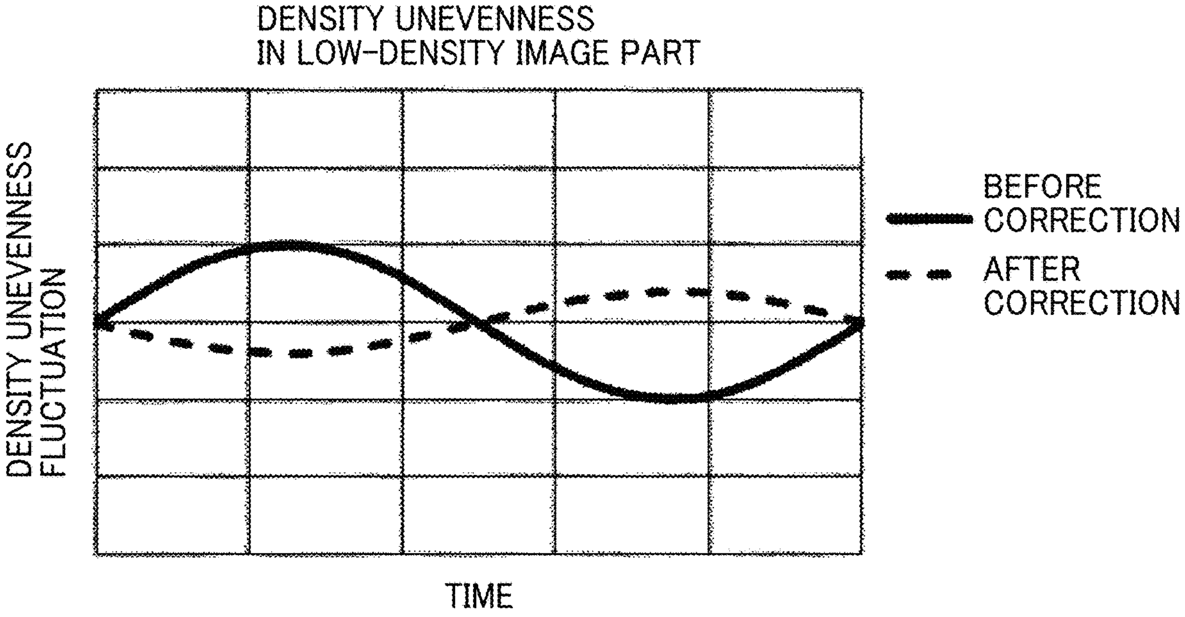
FIG. 12B is a diagram illustrating an example of image-density cycle fluctuations before and after image-density fluctuation-reduction control of a low-density image part of Y color.

FIG. 12A is a diagram illustrating image-density cycle fluctuations before and after the image-density fluctuation-reduction control of the Y-color high-density image part, and FIG. 12B is a diagram illustrating image-density cycle fluctuations before and after the image-density fluctuation-reduction control of the Y-color low-density image part.

As indicated by solid lines in FIGS. 12A and 12B, before the image-density fluctuation-reduction control, the phase of the image-density cycle fluctuation of the high-density image part coincides with the phase of the image-density cycle fluctuation of the low-density image part. However, as indicated by a broken line in FIG. 12A, after the image-density fluctuation-reduction control, the phase of the image-density cycle fluctuation of the low-density image part is inverted (in opposite phase). On the other hand, the phase of the high-density image part is the same after the image-density fluctuation-reduction control and before the image-density fluctuation-reduction control. In the present embodiment, as for the M and C colors as well, it is preferable to correct the cycle fluctuation of the image formation conditions in the image-density fluctuation-reduction control to prevent the color tone of the superimposed image of the low-density image and the high-density image from largely changing due to the inversion of the phase of the image-density cycle fluctuation of the low-density image part after the image-density fluctuation-reduction control. In other words, in the present embodiment, it is preferable to correct the cycle fluctuation of the image formation conditions in the image-density fluctuation-reduction control such that the phase of the image-density cycle fluctuation of the low-density image is not inverted (not in opposite phase) with respect to the phase of the image-density cycle fluctuation of the high-density image.

As illustrated in FIGS. 12A and 12B, since the phase of the image-density cycle fluctuation of the low-density image is inverted after the image-density fluctuation-reduction control, the image formation conditions are corrected so that the phase of the image-density cycle fluctuation of the low-density image is not inverted. As described above, the potential difference between the pre-exposure potential and the developing bias of the photoconductor, that is, the background potential is dominant in the image-density cycle fluctuation of the low-density image. Therefore, in the image-density cycle fluctuation of the low-density image, the contribution of the charging bias forming the pre-exposure potential is large (the change amount of the image density with respect to the change amount of the charging bias is large: sensitivity is high). Therefore, the cycle fluctuation of the charging bias is corrected so that the phase of the image-density cycle fluctuation of the low-density image is not inverted. Thus, in the present embodiment, the following control is performed.

First, in the present embodiment, the cycle fluctuation of the charging bias is corrected in consideration of the fact that the phase is not inverted in the low-density image part to the high-density image part even if the image-density fluctuation-reduction control is performed.

Further, in the control according to the present embodiment, image formation conditions such as a developing bias, a charging bias, and an exposure light amount are cyclically modulated (cycle fluctuation is corrected) so as to cancel the cycle electric field fluctuation, but correction sensitivity is different between the low-density side and the high-density side.

Specifically, in a high-density part such as a solid image, the potential difference between the post-exposure potential and the development potential (developing bias), that is, the developing potential becomes dominant, and thus the contribution of correction of the developing bias is large.

On the other hand, in a low-density part such as a halftone image, the potential difference between the pre-exposure potential and the developing bias of the image bearer, that is, the background potential becomes dominant, and thus, the contribution of correction of the charging bias is large.

The exposure light amount has a smaller difference in sensitivity of correction between the low-density part and the high-density part than that of the developing bias/charging bias.

Based on these, the sensitivity of the correction of the developing bias is high in the high-density part, and the sensitivity of the correction of the charging bias is high in the low-density part. In the correction of the exposure light amount, the sensitivity difference between the low-density part and the high-density part is small.

In general, the sensitivity difference of the correction is the largest in the correction of the developing bias, and then the correction of the charging bias and the correction of the exposure light amount are performed in this order. Therefore, in the present embodiment, the correction amount of the exposure light amount is determined such that the density unevenness phase is not inverted over the entire image density region.

<Controls in Comparative Example>

Figure 13:
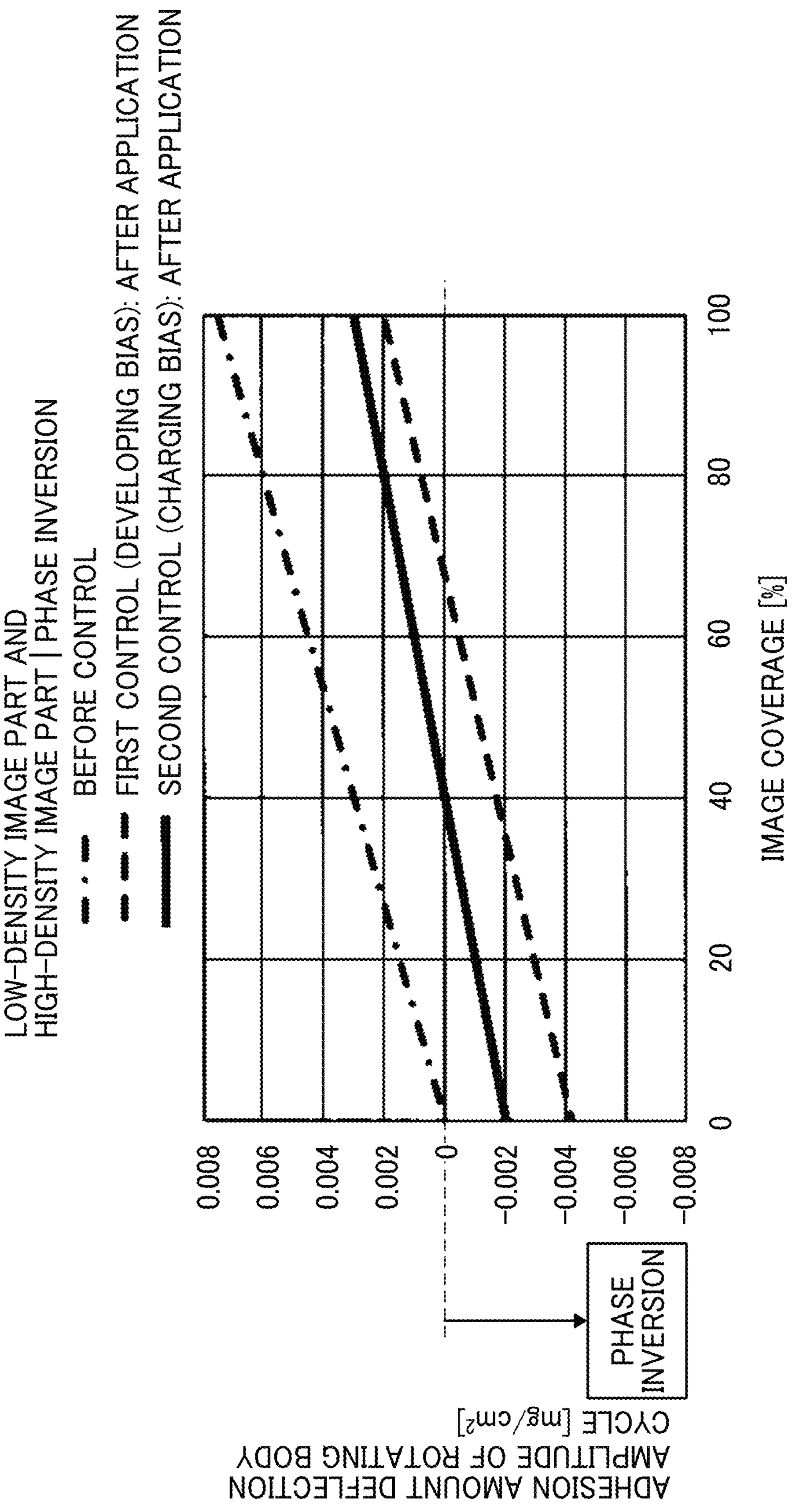
FIG. 13 is a graph illustrating an example of a relationship between a difference value with respect to a target toner adhesion amount at a predetermined rotational position of a photoconductor in a comparative example and image density.

FIG. 13 is a graph illustrating an example of a relationship between a difference value with respect to a target toner adhesion amount at a predetermined rotational position of a photoconductor in a comparative example and image density.

First, effects after the first and second control in the comparative example will be described with reference to the graph of FIG. 13.

First, the first control will be described. In the first control, the image-density cycle fluctuation of a high-density image pattern (image density: 70%) is detected, and a development bias control table is generated so as to cancel out the image density fluctuation of the high-density image pattern. That is, referring to the drawing, the point corresponding to the image density (image coverage) 70% indicated by an alternate long and short dash line is controlled so that the deflection amplitude becomes 0 mg/cm$^2$.

Next, the second control will be described. In the second control, the image-density cycle fluctuation of a halftone image pattern (image density: 40%) formed with cyclical changes in the developing bias is detected, and a charging bias control table is generated so as to cancel out the image density fluctuation of the halftone image pattern. That is, referring to the drawing, the point corresponding to the image density (image coverage) 40% indicated by the broken line is controlled such that the deflection amplitude becomes 0 mg/cm$^2$. That is, referring to the drawing, the point corresponding to the image density (image coverage) 40% indicated by the broken line is controlled such that the deflection amplitude becomes 0 mg/cm$^2$.

In this case, after the control, the phase of the residual image-density cycle fluctuation of the low-density image of the image-density fluctuation-reduction control is inverted (opposite) with respect to the phase of the residual image-density cycle fluctuation of the high-density image, as indicated by the solid line. Accordingly, if the image with a density of less than 40% and the image with a density of 40% or more are superimposed on each other, there is a possibility that the cycle fluctuation of the colors is deteriorated.

Therefore, in the second control, the amplitude of the charging bias cyclically changed in the same phase as the image-density cycle fluctuation before correction is increased by a predetermined value to perform excessive correction so as to cancel out the image density fluctuation obtained by detecting the halftone image pattern. This makes it possible to re-invert the phase of the image density fluctuation of the low-density image whose phase has been inverted after the first control.

As a result, it is also conceivable as a control method that the phase of the image-density cycle fluctuation of the low-density image may be returned to the phase before the control, and the phase of the image-density cycle fluctuation of the low-density image after the image-density fluctuation-reduction control may be matched with the phase of the image-density cycle fluctuation of the high-density image.

However, even in this case, the amplitude of the residual image-density cycle fluctuation after the control described above is about 0.003 mg/cm$^2$, and there is still room for improvement.

Figure 14:
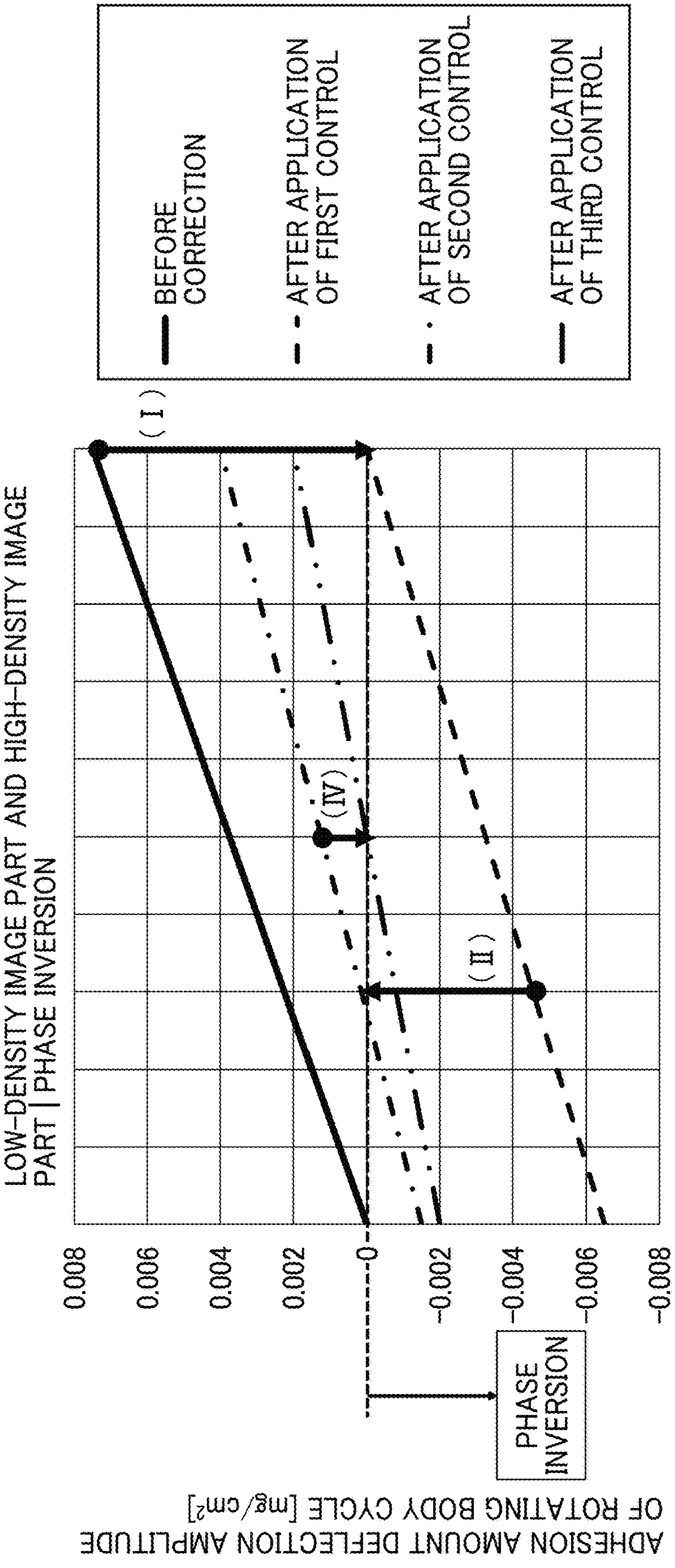
FIG. 14 is a graph illustrating an example of a relationship between a difference value with respect to a target toner adhesion amount at a predetermined rotational position of a photoconductor in a comparative example and image density.

Another control method will be described. Here, this control method is referred to as a comparative example. FIG. 14 is a graph illustrating an example of a relationship between a difference value with respect to a target toner adhesion amount at a predetermined rotational position of a photoconductor and image density.

The graph of FIG. 14 will be described. The solid line in FIG. 14 indicates the state before the image-density fluctuation-reduction control (before correction), the broken line indicates the state after application of the first control, the alternate long and short dash line indicates the state after application of the second control, and the alternate long and two short dashes line indicates the state after application of the third control.

Here, the effects of the first to third controls in the comparative example will be described with reference to the graph of FIG. 14.

First, the first control will be described. In the first control, the image-density cycle fluctuation of a high-density image pattern (image density: 100%) is detected, and a developing bias control table is generated so as to cancel out the image density fluctuation of the high-density image pattern. That is, referring to FIG. 14, the point corresponding to the image density (image coverage) 1000% indicated by the solid line is controlled such that the deflection amplitude becomes 0 mg/cm$^2$ as illustrated in (I).

Next, the second control will be described. In the second control, the image-density cycle fluctuation of a halftone image pattern (image density: 30%) formed with cyclical changes in the developing bias is detected, and a charging bias control table is generated so as to cancel out the image density fluctuation of the halftone image pattern. That is, referring to FIG. 14, the point corresponding to the image density (image coverage) 30% indicated by the broken line is controlled such that the deflection amplitude becomes 0 mg/cm$^2$ as illustrated in (II).

Furthermore, the third control will be described. In the third control, a toner image of a third image pattern (halftone image pattern) is formed on each photoconductor 40 (Y, M, C, K) in a state where the developing bias control table and the charging bias control table are applied. In the same manner as described above, the density (toner adhesion amount) of the toner image of the third image pattern is detected by the toner adhesion amount sensor 310.

Next, using the toner adhesion amount signal (toner image density detection signal) detected by the toner adhesion amount sensor 310 and the rotation position signal of the photoconductor 40 detected by the photointerrupter 71, phase information and amplitude information of the image density fluctuation in one rotation cycle of the photoconductor are obtained. Then, a third image formation condition for each rotational position of the photoconductor 40 (Y, M, C, K) is created from the phase information and the amplitude information. Specifically, a control table for cyclically changing the amount of exposure light for exposing the photoconductor at each rotational position of the photoconductor 40 (Y, M, C, K) is created. The exposure light amount is cyclically changed using the created control table.

That is, referring to FIG. 14, the point corresponding to the image density (image coverage) 50% indicated by the alternate long and short dash line is controlled such that the deflection amplitude becomes 0 mg/cm$^2$ as illustrated in (IV).

However, after the above-described control is performed, the low-density image deflects negatively with respect to the target image density, whereas the high-density image deflects positively with respect to the target image density. That is, it can be seen that the phase of the residual image-density cycle fluctuation of the low-density image is inverted (opposite phase) with respect to the phase of the residual image-density cycle fluctuation of the high-density image.

In addition, as indicated by the alternate long and two short dashes line in FIG. 14, after the third control, the amplitude of the residual image-density cycle fluctuation is about 0.004 mg/cm$^2$, and thus this control method is not desirable.

<Control in Present Embodiment>

Figure 15:
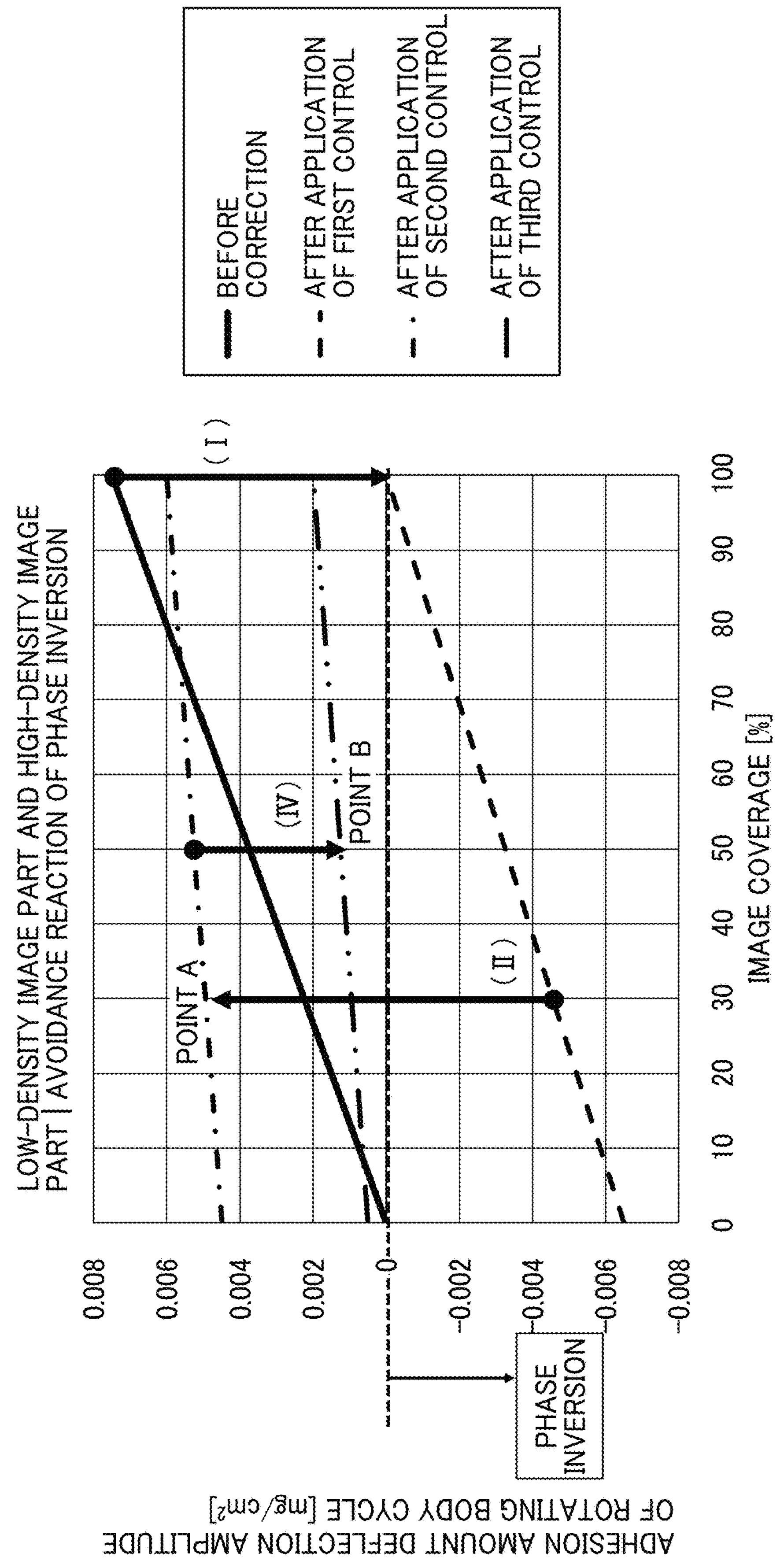
FIG. 15 is a graph illustrating an example of a relationship between a difference value and an image density with respect to a target toner adhesion amount at a predetermined rotational position of a photoconductor according to an embodiment of the present disclosure.

Therefore, the following control is performed for the above problem. FIG. 15 is a graph illustrating an example of a relationship between the image density and the difference value with respect to the target toner adhesion amount at the position where the image-density cycle fluctuation of the photoconductor reaches a peak in the present embodiment. Here, the effects of application of the first to third controls in the present embodiment will be described with reference to the graph of FIG. 15.

First, the first control will be described. In the first control, the image-density cycle fluctuation of a high-density image pattern (image density: 100%) is detected, and a developing bias control table is generated so as to cancel out the image density fluctuation of the high-density image pattern. That is, referring to FIG. 15, the point corresponding to the image density (image coverage) 100°/o indicated by the solid line is controlled such that the deflection amplitude becomes 0 mg/cm$^2$ as illustrated in (I). The first control is not different from the conventional method.

Next, the second control will be described. In the second control, the image-density cycle fluctuation of a halftone image pattern (image density: 30%) formed with cyclical changes in the developing bias is detected, and a charging bias control table is generated so as to cancel out the image density fluctuation of the halftone image pattern.

In the present embodiment, the correction amount of the charging bias is determined in the generated charging bias control table. In addition, a predetermined gain correction is performed on the correction amount of the charging bias. Specifically, the correction amount of the charging bias is set by multiplying by a predetermined gain coefficient. For example, the correction amount is set by multiplying by a gain coefficient such as twice. This coefficient is a numerical value determined by performing evaluation or the like in advance.

That is, referring to FIG. 15, the point corresponding to the image density (image coverage) 30% indicated by the broken line is controlled such that the deflection amplitude becomes the value of the point A as illustrated in (II).

Furthermore, the third control will be described. In the third control, a toner image of a third image pattern (halftone image pattern) is formed on each photoconductor 40 (Y, M, C, K) in a state where the developing bias control table and the charging bias control table are applied. In the same manner as described above, the density (toner adhesion amount) of the toner image of the third image pattern is detected by the toner adhesion amount sensor 310.

Next, using the toner adhesion amount signal (toner image density detection signal) detected by the toner adhesion amount sensor 310 and the rotation position signal of the photoconductor 40 detected by the photointerrupter 71, phase information and amplitude information of the image density fluctuation in one rotation cycle of the photoconductor are obtained. Then, a third image formation condition for each rotational position of the photoconductor 40 (Y, M, C, K) is created from the phase information and the amplitude information. Specifically, a control table for cyclically changing the amount of exposure light for exposing the photoconductor at each rotational position of the photoconductor 40 (Y, M, C, K) is created. Then, correction for cyclically changing the exposure light amount is performed using the created control table.

At this time, in the present embodiment, the correction amount of the exposure light amount is determined in the created control table. In addition, the correction amount of the exposure light amount is subjected to predetermined gain correction. Specifically, the correction amount of the exposure light amount is set by multiplying by a predetermined gain coefficient. For example, the correction amount is set by multiplying by a gain coefficient such as 0.8 time. This coefficient is a numerical value determined by performing evaluation or the like in advance.

That is, referring to FIG. 15, the point corresponding to the image density (image coverage) 50% indicated by the alternate long and short dash line is controlled such that the deflection amplitude becomes the value at point B as illustrated in (IV).

By performing the above-described control, as indicated by the alternate long and two short dashes line in FIG. 15, the amplitude of the residual image-density cycle fluctuation after the third control can be reduced to about 0.002 $mg/cm^2$. As a result, the cycle fluctuation of the image density can be favorably reduced.

Further, both the low-density image and the high-density image fluctuate positively with respect to the target image density. That is, it can be seen that the phase of the residual image-density cycle fluctuation of the low-density image coincides with the phase of the residual image-density cycle fluctuation of the high-density image. Accordingly, it is possible to reduce cyclic changes in the color tone of a superimposed image of the low-density image and the high-density image.

In view of the control method described above, the present embodiment according to FIG. 15 differs from the comparative example according to FIG. 14 as described below. First, the first control is the same as the first control according to the comparative example.

On the other hand, as for the second control, in the comparative example, it can be said that the correction amount of the charging bias is obtained by multiplying by a predetermined gain coefficient of 1.0. However, the present embodiment is different in that the correction amount of the charging bias is obtained by multiplying by a predetermined gain coefficient such as twice.

Furthermore, as for the third control, in the comparative example, it can be said that the correction amount of the exposure light amount is obtained by multiplying by a predetermined gain coefficient of 1.0. However, the present embodiment is different in that the correction amount of the exposure light amount is obtained by multiplying by a predetermined gain coefficient such as 0.8 times.

Then, in this manner, at the time of performing the third control, the phase of the residual image-density cycle fluctuation of the low-density image can be made the same phase as the phase of the residual image-density cycle fluctuation of the high-density image. Accordingly, it is possible to reduce cyclic changes in the color tone of a superimposed image of the low-density image and the high-density image.

That is, in the present embodiment, it is preferable that the correction amount of the charging bias in the second control and the correction amount of the exposure light amount in the third control are subjected to gain correction by multiplying with a gain coefficient having a value other than 1. Then, the gain coefficient in the second control is preferably made larger than the conventional gain coefficient to increase the deflection amplitude, and the gain coefficient in the third control is preferably made smaller than the conventional gain coefficient, so that the phases of low density to high density can be matched at the time of performing the third control. The gain factor described above is determined by performing evaluation or the like in advance so that the phases of low density to high density can be matched at the time of performing the third control. These gain factors are merely examples, and vary depending on the model and environment.

The above-described embodiments are examples. Embodiments of the present disclosure can provide, for example, some advantages in the following aspects.

First Aspect

A first aspect is an image forming apparatus including: a plurality of image forming units (for example, the image forming units 18) including an image bearer (for example, the photoconductor 40), a charger (for example, the charging device 60) that uniformly charges the image bearer, and a developer bearer that forms a visible image by attaching developer to an electrostatic latent image formed on the image bearer; an exposure device (for example, the exposure device 21) that exposes the image bearer charged by the charger to form the electrostatic latent image on the image bearer, an image-density cycle-fluctuation acquiring unit (for example, the controller 500 and the like) that acquires an image-density cycle fluctuation in the visible image for each of the plurality of image forming units; and an image-density fluctuation-reduction control unit (for example, the controller 500 and the like) that performs image-density fluctuation-reduction control of cyclically changing image formation conditions to reduce the image-density cycle fluctuation for each of the plurality of image forming units on the basis of the image-density cycle fluctuation of each of the plurality of image forming units acquired by the image-density cycle-fluctuation acquiring unit, the image-density fluctuation-reduction control unit performs: first fluctuation-reduction control (for example, the first control) of correcting a developing bias to be applied to the developer bearer, which is one of the image formation conditions, to cancel out image-density cycle fluctuation of an acquired high-density image pattern (for example, 100%); second fluctuation-reduction control (for example, the second control) of correcting a charging bias to be applied to the charger, which is one of the image formation conditions, to cancel out image-density cycle fluctuation of an acquired first low-density image pattern (for example, 30%), after the first fluctuation-reduction control is performed; and third fluctuation-reduction control (for example, the third control) of correcting an exposure light amount of the exposure device, which is one of the image formation conditions, to cancel out image-density cycle fluctuation of an acquired second low-density image pattern (for example, 50%), after the first fluctuation-reduction control and the second fluctuation-reduction control are performed.

According to the first aspect, cyclic changes can be reduced in the color tone of a superimposed image of a low-density image and a high-density image.

Second Aspect

According to a second aspect, in the first aspect, a phase control unit (for example, the controller 500 and the like) that performs phase matching control of matching phases of image-density cycle fluctuations of the image forming units on a recording medium based on the image-density cycle fluctuations of the image forming units acquired by the image-density cycle-fluctuation acquiring unit is included.

According to the second aspect, the cycle fluctuation of the image density can be favorably reduced.

Third Aspect

According to a third aspect, in the first aspect or the second aspect, a correction amount of the charging bias is an amount obtained by predetermined gain correction.

According to the third aspect, the cycle fluctuation of the image density can be favorably reduced.

Fourth Aspect

In a fourth aspect, a gain coefficient of the predetermined gain correction is a value larger than 1.0 (for example, 2.0).

According to the fourth aspect, in the third aspect, the cycle fluctuation of the image density can be favorably reduced.

Fifth Aspect

According to a fifth aspect, in any one of the first to fourth aspects, an correction amount of the exposure light amount is an amount obtained by predetermined gain correction.

According to the fifth aspect, the cycle fluctuation of the image density can be favorably reduced.

Sixth Aspect

In a sixth aspect, a gain coefficient of the predetermined gain correction is a value smaller than 1.0 (for example, 0.8).

According to the sixth aspect, in the fifth aspect, the cycle fluctuation of the image density can be favorably reduced.

Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus, comprising:

a plurality of image formers each including:

Y, M, C, and B (Yellow, Magenta, Cyan and Black) image bearers;

a plurality of chargers to uniformly charge each of the image bearers; and a plurality of developer bearers corresponding to the image bearers to attach developer to an electrostatic latent image on each of the image bearers to form a visible image;

an irradiator to illuminate each of the image bearers charged by the chargers to form the electrostatic latent image on each of the image bearers; and circuitry configured to:

acquire an image-density cycle fluctuation in the visible image for each of the plurality of image formers; and perform image-density fluctuation-reduction control to cyclically change image forming conditions to reduce the image-density cycle fluctuation for each of the plurality of image formers on basis of the image-density cycle fluctuation of each of the plurality of image formers acquired by the circuitry, the circuitry being further configured to perform:

first fluctuation-reduction control to correct a developing bias applied to the developer bearers, which is one of the image forming conditions, to cancel an image-density cycle fluctuation of a high-density image pattern acquired by the circuitry;

second fluctuation-reduction control to, after the first fluctuation-reduction control, correct a charging bias applied to the chargers, which is one of the image forming conditions, to cancel an image-density cycle fluctuation of a first low-density image pattern acquired by the circuitry; and third fluctuation-reduction control to, after the first fluctuation-reduction control and the second fluctuation-reduction control, correct an exposure light amount of the irradiator, which is one of the image forming conditions, to cancel an image-density cycle fluctuation of a second low-density image pattern acquired by the circuitry, the high-density image pattern being higher in image density than each of the first low-density image pattern and the second low-density image pattern, wherein:

the circuitry is configured to perform phase matching control which matches phases of image-density cycle fluctuations of the plurality of image formers on a recording medium, based on the image-density cycle fluctuations of the plurality of image formers acquired by the circuitry, the circuitry rotates the Y, M, and C image bearers to match the phases of the Y, M, and C image-density cycle fluctuations, and colors subjected to the phase matching control include the Y, M, and C colors.

2. The image forming apparatus according to claim 1, wherein a correction amount of the charging bias is an amount obtained by gain correction.

3. The image forming apparatus according to claim 2, wherein a gain coefficient of the gain correction is a value larger than 1.0.

4. The image forming apparatus according to claim 1, wherein a correction amount of the exposure light amount is an amount obtained by gain correction.

5. The image forming apparatus according to claim 4, wherein a gain coefficient of the gain correction is a value smaller than 1.0.

6. The image forming apparatus according to claim 1, wherein:

the circuitry controls a rotation speed of any one of the Y, M, and C image bearers based on a rotation speed of another one of the Y, M, and C image bearers.

7. The image forming apparatus according to claim 6, wherein;

the circuitry controls rotation speeds of the M image bearer and the C image bearer based on a rotation speed of the Y image bearer.

8. The image forming apparatus according to claim 1, wherein:

the color B is not a subject of the phase matching control.

* * * * *